United States Patent
Takahashi et al.

(10) Patent No.: US 12,496,800 B2
(45) Date of Patent: Dec. 16, 2025

(54) RIBBON LAMINATED BODY

(71) Applicant: Mitsubishi Electric Corporation, Tokyo (JP)

(72) Inventors: Ichiya Takahashi, Tokyo (JP); Shigeru Utsumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 75 days.

(21) Appl. No.: 18/561,744

(22) PCT Filed: May 25, 2021

(86) PCT No.: PCT/JP2021/019691
§ 371 (c)(1),
(2) Date: Nov. 17, 2023

(87) PCT Pub. No.: WO2022/249260
PCT Pub. Date: Dec. 1, 2022

(65) Prior Publication Data
US 2024/0217201 A1    Jul. 4, 2024

(51) Int. Cl.
*B32B 37/12* (2006.01)
*B32B 1/08* (2006.01)
(Continued)

(52) U.S. Cl.
CPC ............... *B32B 3/12* (2013.01); *B32B 1/08* (2013.01); *B32B 7/14* (2013.01); *B32B 37/12* (2013.01);
(Continued)

(58) Field of Classification Search
None
See application file for complete search history.

(56) References Cited

U.S. PATENT DOCUMENTS

| 4,981,744 | A | * | 1/1991 | Swank | B32B 3/12 |
| | | | | | 428/116 |
| 6,054,200 | A | * | 4/2000 | Woods | B32B 37/146 |
| | | | | | 428/116 |
| 2017/0210948 | A1 | * | 7/2017 | Robitaille | C09J 131/04 |

FOREIGN PATENT DOCUMENTS

| JP | 62-220329 A | 9/1987 |
| JP | H07-186311 A | 7/1995 |

(Continued)

OTHER PUBLICATIONS

Banea et al., High Temperature Adhesives for Aerospace Applications, Sep. 28, 2012 (Year: 2012).*

(Continued)

*Primary Examiner* — Mary I Omori
(74) *Attorney, Agent, or Firm* — XSENSUS LLP

(57) ABSTRACT

A ribbon laminated body used for creating a honeycomb core is constituted by a plurality of layers of ribbons laminated, a low-temperature curing adhesion portion, and a high-temperature curing adhesion portion. A low-temperature curing adhesion portion adhesively bonds adjacent ribbons, and a high-temperature curing adhesion portion is in contact with both ribbons. At a portion where the low-temperature curing adhesion portion is in contact with a ribbon, the shape of the low-temperature curing adhesion portion is a trapezoidal shape, wherein an upper base is overlapped with a part of one long side of the ribbon, and a lower base is overlapped with a part of the other long side of the ribbon. At a portion where the high-temperature curing adhesion portion is in contact with the ribbon, a part of a periphery of the high-temperature curing adhesion portion is in contact with an oblique side a low-temperature curing adhesion portion.

4 Claims, 21 Drawing Sheets

(51) Int. Cl.
   *B32B 3/12*       (2006.01)
   *B32B 7/14*       (2006.01)
   *B32B 38/00*      (2006.01)
(52) U.S. Cl.
   CPC ...... *B32B 37/1292* (2013.01); *B32B 38/0004* (2013.01); *B32B 2037/1253* (2013.01); *B32B 2038/0076* (2013.01); *B32B 2305/024* (2013.01); *B32B 2305/72* (2013.01)

(56) References Cited

FOREIGN PATENT DOCUMENTS

| | | |
|---|---|---|
| JP | H09-290470 A | 11/1997 |
| JP | H10-156983 A | 6/1998 |

OTHER PUBLICATIONS

Extended European Search Report issued Jun. 11, 2024, in corresponding European Patent Application No. 21942917.2, 7pp.
International Search Report and Written Opinion mailed on Aug. 10, 2021, received for PCT Application PCT/JP2021/019691, filed on May 25, 2021, 8 pages including English Translation.

\* cited by examiner

RIBBON LAMINATED BODY

CROSS-REFERENCE TO RELATED APPLICATION

This application is based on PCT filing PCT/JP2021/019691, filed May 25, 2021, the contents of which are incorporated by reference.

TECHNICAL FIELD

The present disclosure relates to a ribbon laminated body, a honeycomb core precursor, a honeycomb core, a cylindrical structure, a central cylinder for an artificial satellite and a ribbon laminated body creating method.

BACKGROUND ART

As a cylindrical structure, for example, a central cylinder for an artificial satellite, a sandwich structure wherein a honeycomb core is sandwiched between facings is used for the perspective of weight saving. Since it is necessary to shape a honeycomb core being a planar extendable structure into a cylindrical shape in creating a cylindrical structure, there has been a problem that, due to the geometric property, saddle-shape deformation is generated, and workability is poor. The saddle-shape deformation is warpage in a hyperboloid shape generated in an axial direction of a cylinder.

Therefore, a honeycomb core that can be shaped into a cylindrical shape has been designed. Specifically, Patent Literature 1 discloses a method to extend a honeycomb core into a cylindrical shape by making a shape of an adhesion portion into a trapezoidal shape.

CITATION LIST

Patent Literature

Patent Literature 1: JP1995-186311 A

SUMMARY OF INVENTION

Technical Problem

In the method disclosed in Patent Literature 1, when a honeycomb core is extended to a cylindrical shape having a radius other than the radius determined in accordance with the size of the adhesion portion, a bent portion is generated in a cell wall surface of the honeycomb core. There has been a problem in this method that shear stiffness of the honeycomb core is decreased since the cell wall surface is likely to fall down sideways due to the bent portion when a bending load is applied to the honeycomb core.

The present disclosure is aimed at providing a ribbon laminated body used for creating a honeycomb core capable of being extended to a cylindrical shape having an arbitrary radius within a prescribed range without decreasing shear stiffness of the honeycomb core.

Solution to Problem

There is provided according to one aspect of the present disclosure a ribbon laminated body used for creating a honeycomb core, the ribbon laminated body comprises:
a multilayer ribbon wherein a plurality of layers of ribbons are laminated;
a low-temperature curing adhesion portion constituted by a low-temperature curing adhesive; and
a high-temperature curing adhesion portion constituted by a high-temperature curing adhesive that is cured at a temperature higher than a temperature at which the low-temperature curing adhesive is cured, wherein
in the multilayer ribbon, the plurality of layers of ribbons are laminated so that two long sides included in each ribbon are aligned with one another,
in the multilayer ribbon, between each two ribbons adjacent to each other, the low-temperature curing adhesion portion that adhesively bonds both of the two ribbons, which is in contact with the both of the two ribbons, and the high-temperature curing adhesion portion which is in contact with the both of the two ribbons exist,
in a part where the low-temperature curing adhesion portion is in contact with each of the two ribbons, a shape of the low-temperature curing adhesion portion is a trapezoidal shape having an upper base, a lower base longer than the upper base, and two oblique sides, wherein an angle formed by the upper base and each of the two oblique sides is an obtuse angle, and wherein at least a part of the upper base is overlapped with a part of one of the two long sides of each of the two ribbons, and at least a part of the lower base is overlapped with a part of the other of the two long sides of each of the two ribbons,
the low-temperature curing adhesion portion is cured, and the high-temperature curing adhesion portion is not cured,
in a portion where the high-temperature curing adhesion portion is in contact with each of the ribbons, a part of a periphery of the high-temperature curing adhesion portion is in contact with at least a part of one of the two oblique sides included in one of the low-temperature curing adhesion portions.

Advantageous Effects of Invention

According to the present disclosure, when a ribbon laminated body is extended to a honeycomb core in a cylindrical shape, it is possible to shape the ribbon laminated body into a desired cylindrical shape without making a cell wall surface of the honeycomb core fall down sideways and the honeycomb core be deformed into a saddle shape, by making a high-temperature curing adhesive that has not been cured peel off partially in accordance with a radius of the cylindrical shape. Further, according to the present disclosure, since ribbons are bonded together by curing a high-temperature curing adhesive that has not peeled off, a bending surface is not generated in the cell wall surface; therefore, the cell wall surface is unlikely to fall down sideways, and as a result, the shear stiffness of the honeycomb core is retained.

Therefore, according to the present disclosure, it is possible to provide a ribbon laminated body used for creating a honeycomb core which can be extended to a cylindrical shape having an arbitrary radius within a prescribed range without reducing the shear stiffness of the honeycomb core.

DESCRIPTION OF EMBODIMENTS

Figure 1:
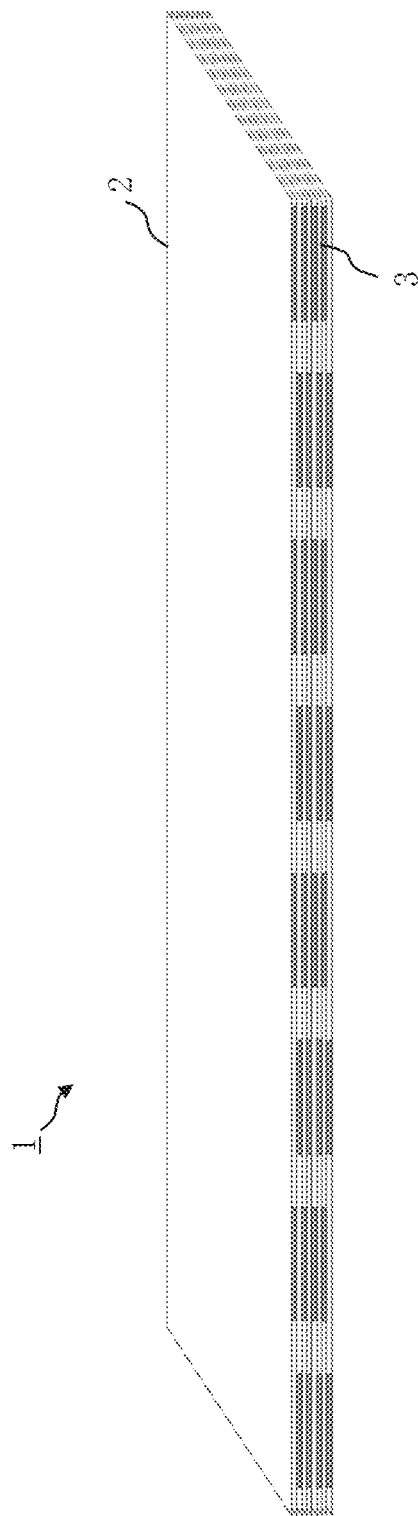
FIG. 1 is a schematic diagram illustrating a ribbon laminated body 1 according to a first embodiment.

In description of embodiments and diagrams, the same elements and corresponding elements are denoted by the same reference numerals. The description of the elements denoted by the same reference numerals is omitted or simplified appropriately.

First Embodiment

Hereinafter, a detailed description will be made on a present embodiment with reference to diagrams.

Description of Configuration

Figure 2:
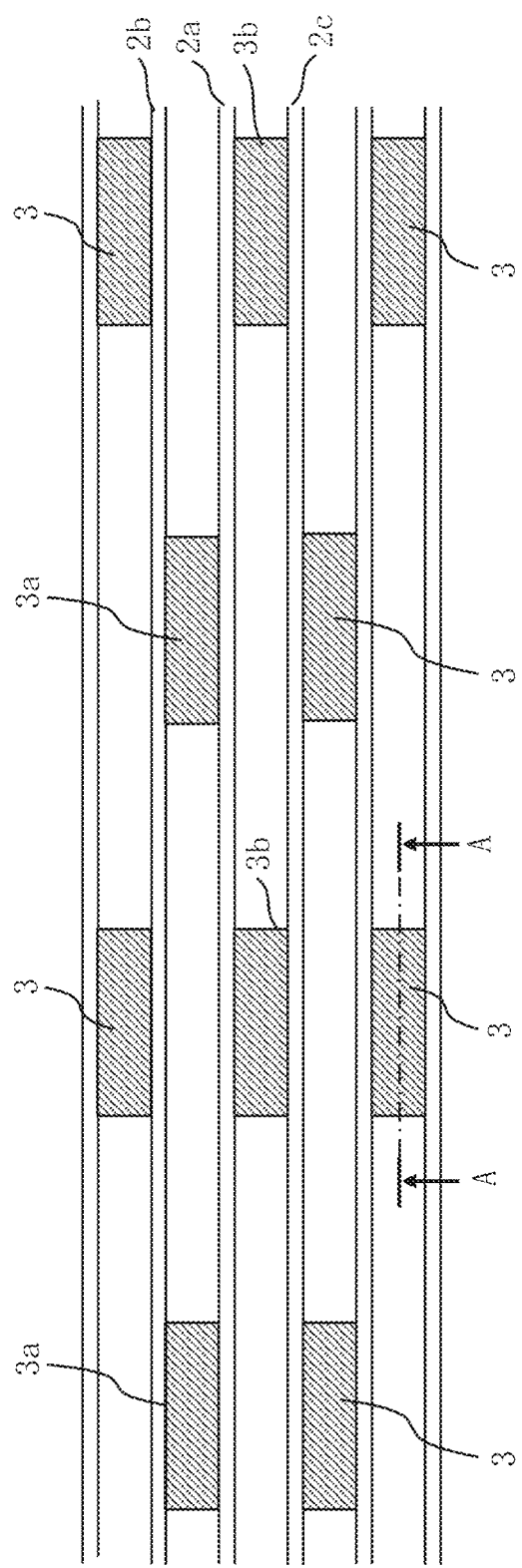
FIG. 2 is a schematic diagram illustrating a state wherein the ribbon laminated body is enlarged according to the first embodiment.
Figure 3:
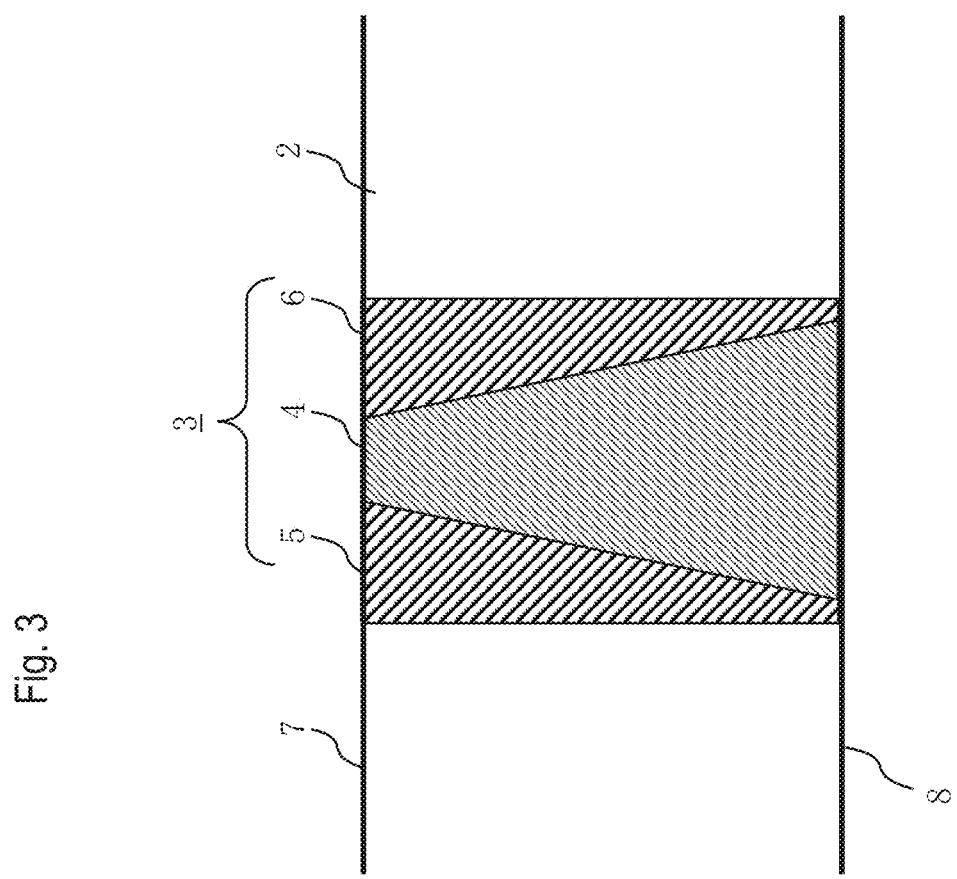
FIG. 3 is a schematic diagram illustrating a cross section of the ribbon laminated body 1 according to the first embodiment.

FIG. 1, FIG. 2, and FIG. 3 are schematic diagrams illustrating concrete examples of a ribbon laminated body 1 according to a first embodiment. The ribbon laminated body 1 is used for creating a honeycomb core, which is also called a ribbon laminated body for a honeycomb core.

As illustrated in FIG. 1, the ribbon laminated body 1 is constituted by a plurality of layers of ribbons 2 and adhesion portions 3, wherein the plurality of layers of ribbons 2 are laminated so that two long sides included in each ribbon 2 are aligned. The plurality of layers of ribbons 2 are also called a multilayer ribbon. Further, each ribbon 2 and a ribbon 2 adjacent to the each ribbon 2 are bonded together with the adhesion portion 3. The ribbon 2 is composed of aluminum or aramid fiber paper, etc., for example. The aramid fiber paper is Nomex (registered trademark), for example.

FIG. 2 is an enlarged view illustrating a configuration example of the ribbon laminated body 1.

A ribbon 2a is bonded to a ribbon 2b adjacent to the ribbon 2a with adhesion portions 3a. The alphabets attached to the end of signs are denoted to distinguish between a plurality of elements.

The adhesion portions 3a are arranged at an equal pitch between the ribbon 2a and the ribbon 2b.

The ribbon 2a is bonded to a ribbon 2c with adhesion portions 3b on a surface on the opposite side of a surface facing the ribbon 2b.

The adhesion portions 3b are arranged at an equal pitch equivalent to the equal pitch between the adhesion portions 3a, between the layers of the ribbon 2b and the ribbon 2c. The pitch between the adhesion portions 3b is equivalent to the pitch between the adhesion portions 3a, and the positions of the adhesion portions 3b are shifted by half the pitch from the adhesion portions 3a in the longitudinal direction of ribbons. The length of half the pitch corresponds to half the length of the pitch between the adhesion portions 3a. The length of half the pitch may not necessarily be exactly half the length of the pitch between the adhesion portions 3a. The longitudinal direction of ribbons is a direction along a long side of the ribbon 2. The interval between the adjacent adhesion portions 3 may not necessarily be exactly identical.

Other adhesion portions 3 have similar configurations as the adhesion portions 3a and the adhesion portions 3b. That is, the adhesion portions 3 are arranged at an equal pitch between the same ribbon layers, and positions of the adhesion portions 3 between certain ribbon layers are placed at positions shifted by half the pitch in the longitudinal direction of the ribbons from the positions of the adhesion portions 3 between ribbon layers adjacent to the certain ribbon layers.

FIG. 3 illustrates a concrete example of an A-A cross section of an adhesion portion 3 illustrated in FIG. 2.

The adhesion portion 3 is constituted by an adhesion portion 4, an adhesion portion 5 and an adhesion portion 6. Each of the adhesion portion 4, the adhesion portion 5 and the adhesion portion 6 is composed of an adhesive. The adhesive composing the adhesion portion 4 is called a low-temperature curing adhesive. The adhesion portion 4 is also called a low-temperature curing adhesion portion. The adhesive composing each of the adhesion portion 5 and the adhesion portion 6 is called a high-temperature curing adhesive. The high-temperature curing adhesive is cured at a temperature higher than the temperature at which the low-temperature curing adhesive is cured. Each of the adhesion portion 5 and the adhesion portion 6 is also called a high-temperature curing adhesion portion. Between each two ribbons 2 adjacent to each other, there exist a low-temperature curing adhesion portion that adhesively bonds both ribbons 2, which is in contact with the both ribbons 2, and a high-temperature curing adhesion portion that is in contact with the both ribbons 2. The material of the adhesive is, for example, an epoxy adhesive or an acrylic adhesive.

The curing temperature of the adhesive composing the adhesion portion 4 is lower than the curing temperature of the adhesive composing each of the adhesion portion 5 and the adhesion portion 6. Further, in the ribbon laminated body 1, the state of the adhesive composing the adhesion portion 4 is a cured state, whereas the state of the adhesive composing each of the adhesion portion 5 and the adhesion portion 6 is in an uncured state. Therefore, as a concrete example, the adhesive composing the adhesion portion 4 is a room-temperature curing type adhesive, and the adhesive composing each of the adhesion portion 5 and the adhesion portion 6 is a thermosetting type adhesive which is cured at a temperature higher than room-temperature.

The adhesive composing each of the adhesion portion 5 and the adhesion portion 6 has an adhesive force with a magnitude whereby the adhesion portion 6 is peeled off by an extension force in a depthwise direction of the ribbon 2 at the time when a honeycomb core precursor is generated.

The shape of the adhesion portion 4 at the A-A cross section is a trapezoidal shape. The trapezoidal shape is typically a shape similar to a trapezoid, which may not exactly be a trapezoid; however, description will be made by regarding the shape of the adhesion portion 4 at the A-A cross section as a trapezoid. With respect to two parallel sides included in the trapezoidal shape, when a shorter one is defined as an upper base, and the other one is defined as a lower base, the upper base of the adhesion portion 4 is located on a ribbon long side 7, and the lower base of the adhesion portion 4 is located on a ribbon long side 8. Further, a part of the periphery of the adhesion portion 5 is overlapped with at least a part of one of two oblique sides included in the trapezoidal shape, and a part of the periphery of the adhesion portion 6 is overlapped with at least a part of the other oblique side. The shape of the low-temperature curing adhesion portion at a portion where the low-temperature curing adhesion portion is in contact with the ribbon 2 is a trapezoidal shape including an upper base, a lower base longer than the upper base and two oblique sides, wherein the angle formed by the upper base and each of two oblique sides is an obtuse angle. Further, at least a part of the upper base is overlapped with a part of one long side of the ribbon 2, and at least a part of the lower base is overlapped with a part of the other long side of the ribbon 2. At a portion where the high-temperature curing adhesion portion is in contact with the ribbon 2, a part of the periphery of the high-temperature curing adhesion portion is in contact with at least a part of one oblique side of two oblique sides included in one of the low-temperature curing adhesion portions. A part of the periphery of the high-temperature curing adhesion portion is overlapped with a part of one long side of the ribbon 2 at a portion where the high-temperature curing adhesion portion is in contact with the ribbon 2. The high-temperature curing adhesion portion is peeled off from the ribbon 2 which the high-temperature curing adhesion portion is in contact with, by the extension force at the time when a honeycomb core precursor corresponding to the ribbon laminated body 1 is generated.

The shapes of the adhesion portion 5 and the adhesion portion 6 may be set appropriately; however, it is desirable to make a part of the periphery of each of the adhesion portion 5 and the adhesion portion 6 be shared with the ribbon long side 7.

Further, as the area of each of the adhesion portion 5 and the adhesion portion 6 increases, the weight of the honeycomb core is increased; therefore, it is desirable to set each of the adhesion portion 5 and the adhesion portion 6 so that the area of each of the adhesion portion 5 and the adhesion portion 6 is minimized.

In a case wherein the ribbon laminated body 1 is extended to a planar shape, and in a case wherein the ribbon laminated body 1 is extended to a cylindrical curved surface with an inner diameter equal to or larger than a cylindrical inner diameter determined from the shape of the adhesion portion 4, as illustrated in FIG. 3, the adhesion portion 3 may have any shape as long as it is a rectangular shape wherein each of the long sides of the adhesion portion 3 coincides with the ribbon long side 7 or the ribbon long side 8.

Description of Effect of First Embodiment

As described above, according to the present embodiment, the ribbon laminated body 1 used for creating a honeycomb core is created.

Second Embodiment

Hereinafter, description will be made mainly on points different from those described in the embodiment above with reference to diagrams.

Description of Configuration

Figure 4:
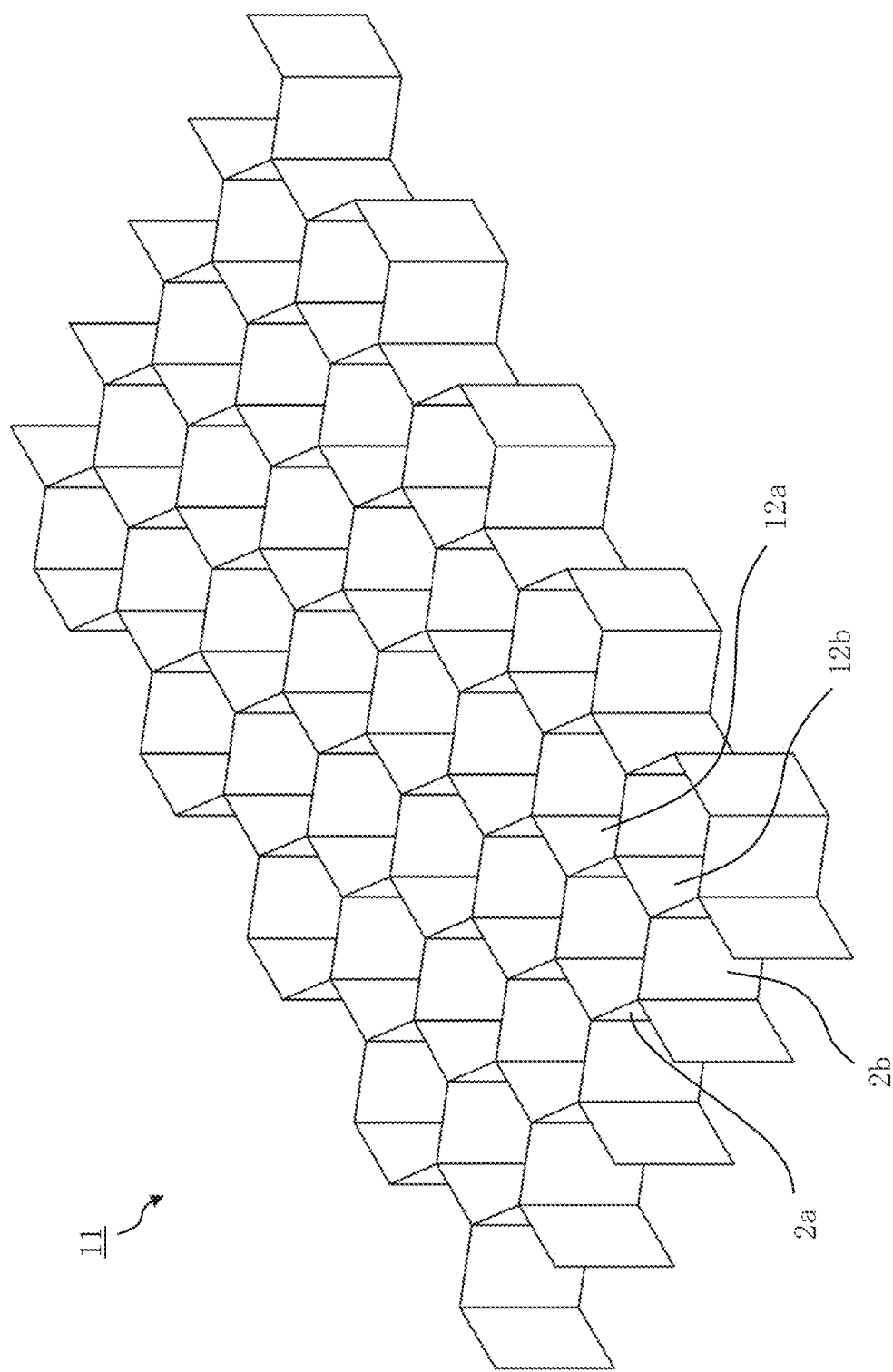
FIG. 4 is a schematic diagram illustrating a honeycomb core precursor 11 according to a second embodiment.
Figure 5:
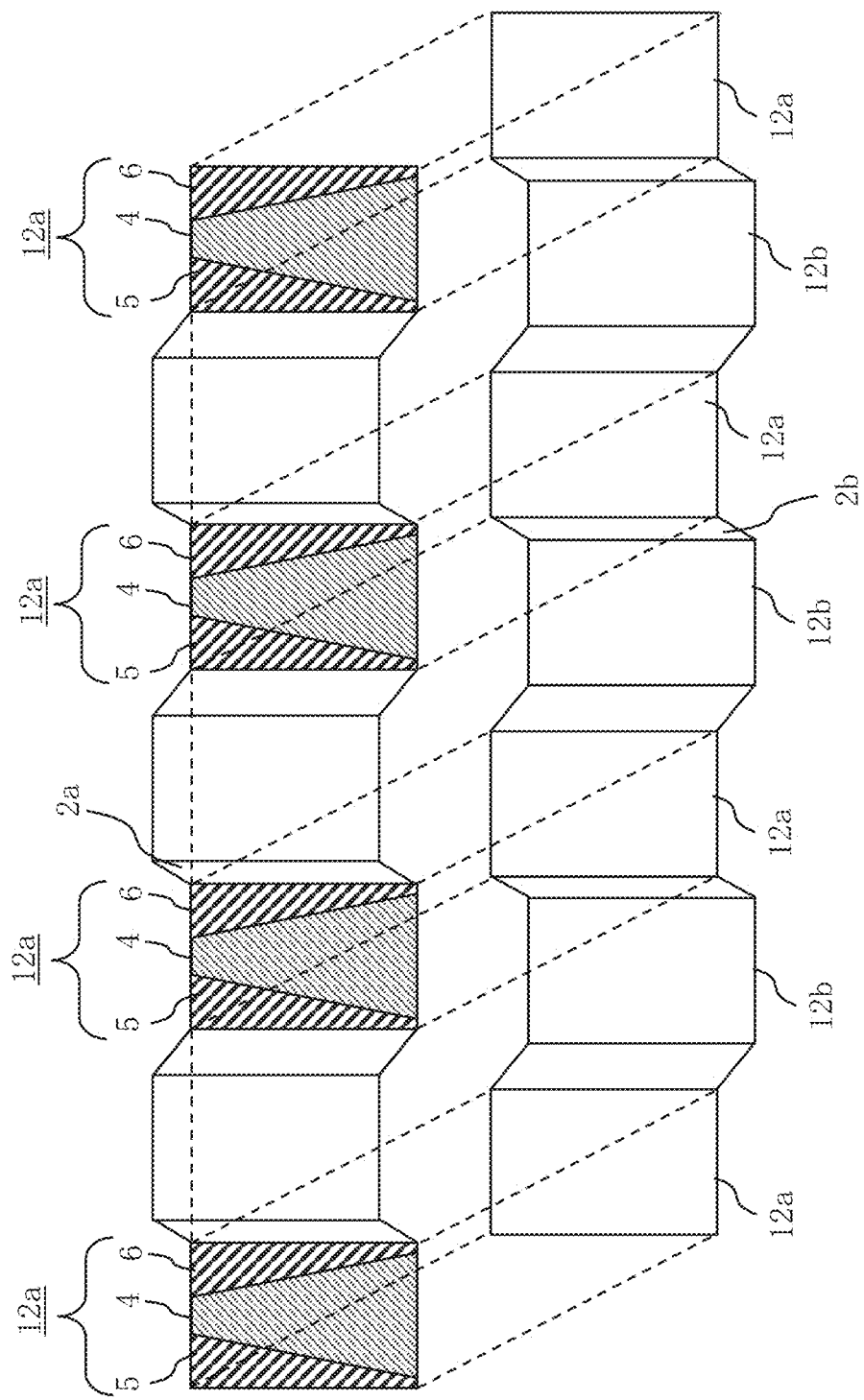
FIG. 5 is a schematic diagram explaining the honeycomb core precursor 11 according to the second embodiment.

FIG. 4 and FIG. 5 are schematic diagrams illustrating concrete examples of a honeycomb core precursor 11 according to a second embodiment.

FIG. 4 illustrates the honeycomb core precursor 11 extended to become a planar shape by extending the ribbon laminated body 1 in a ribbon lamination direction. The ribbon lamination direction is also a lamination direction of the multilayer ribbon. The honeycomb core precursor 11 is also called a planar extended honeycomb core precursor.

The ribbon 2a and the ribbon 2b are bonded with a ribbon joint 12a.

FIG. 5 illustrates a state wherein the ribbon 2a and the ribbon 2b are virtually detached so as to show the shape of the ribbon joint 12a when the ribbon laminated body 1 is extended.

The ribbon joint 12a joins the ribbon 2a and the ribbon 2b via the adhesion portion 4, the adhesion portion 5 and the adhesion portion 6. Each of the adhesion portion 5 and the adhesion portion 6 is partially peeled off when the ribbon laminated body 1 is extended, and the shape of the ribbon joint 12a becomes a rectangular shape with a set of two parallel sides on the ribbon long side. Similarly, the shape of the ribbon joint 12b that joins the ribbon 2b and the ribbon 2c also becomes a rectangular shape. The shapes of all the ribbon joints 12 similarly become rectangular shapes, and as a result, the honeycomb core precursor 11 is extended to a planar shape having thickness.

Further, by curing adhesives constituting each of the adhesion portion 5 and the adhesion portion 6 by heating the honeycomb core precursor 11 at a temperature at which both of the adhesion portion 5 and the adhesion portion 6 are cured, that is, a temperature equal to or higher than a temperature at which the high-temperature curing adhesive is cured, a honeycomb core extended to a planar shape having thickness is created.

Description of Effect of Second Embodiment

As described above, according to the present embodiment, the honeycomb core precursor 11 used for creating a honeycomb core extended to a planar shape having thickness is created.

Third Embodiment

Hereinafter, description will be made mainly on portions different from those of the embodiments described above with reference to diagrams.

Description of Configuration

Figure 6:
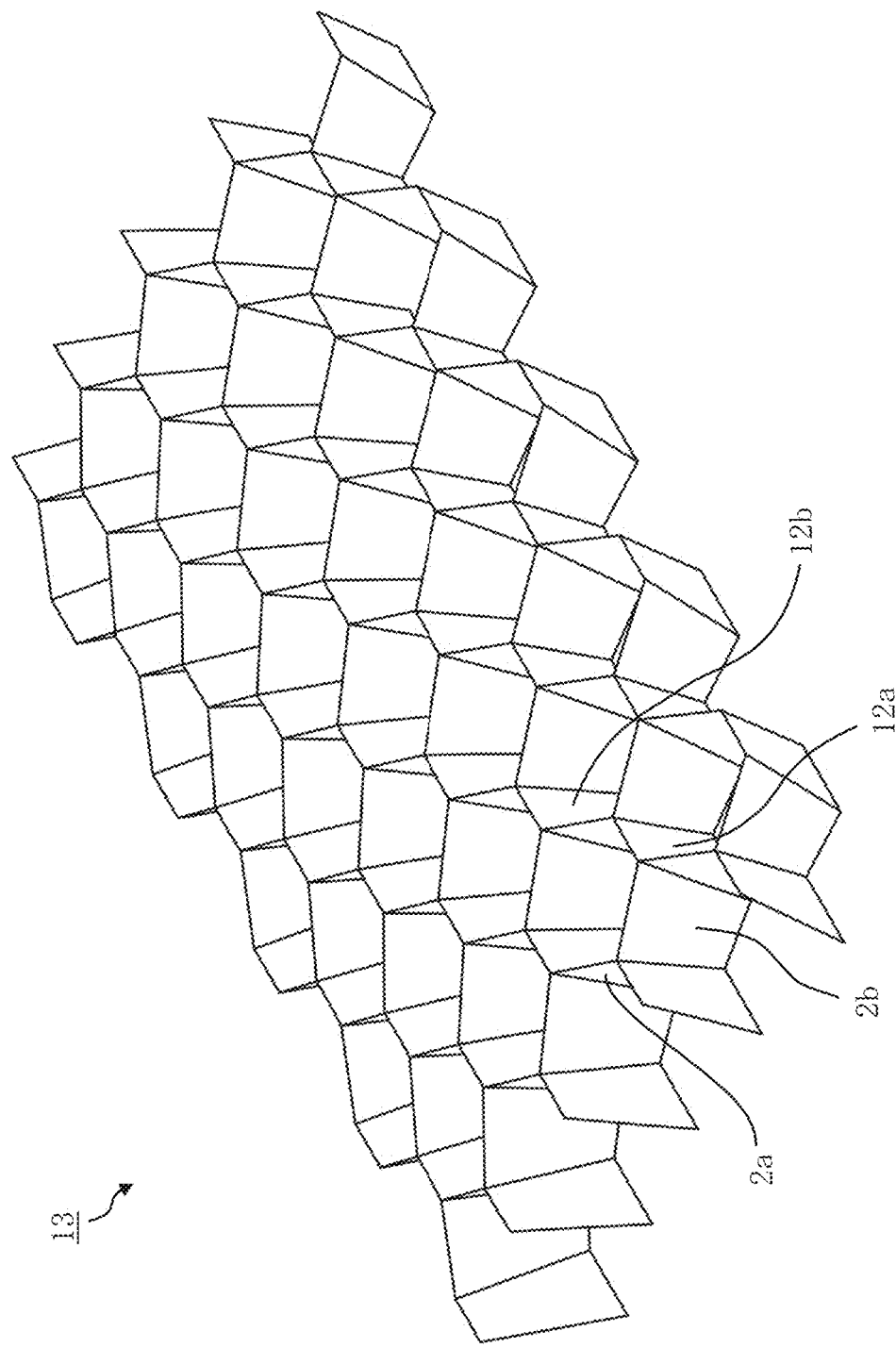
FIG. 6 is a schematic diagram illustrating a honeycomb core precursor 13 according to a third embodiment.
Figure 7:
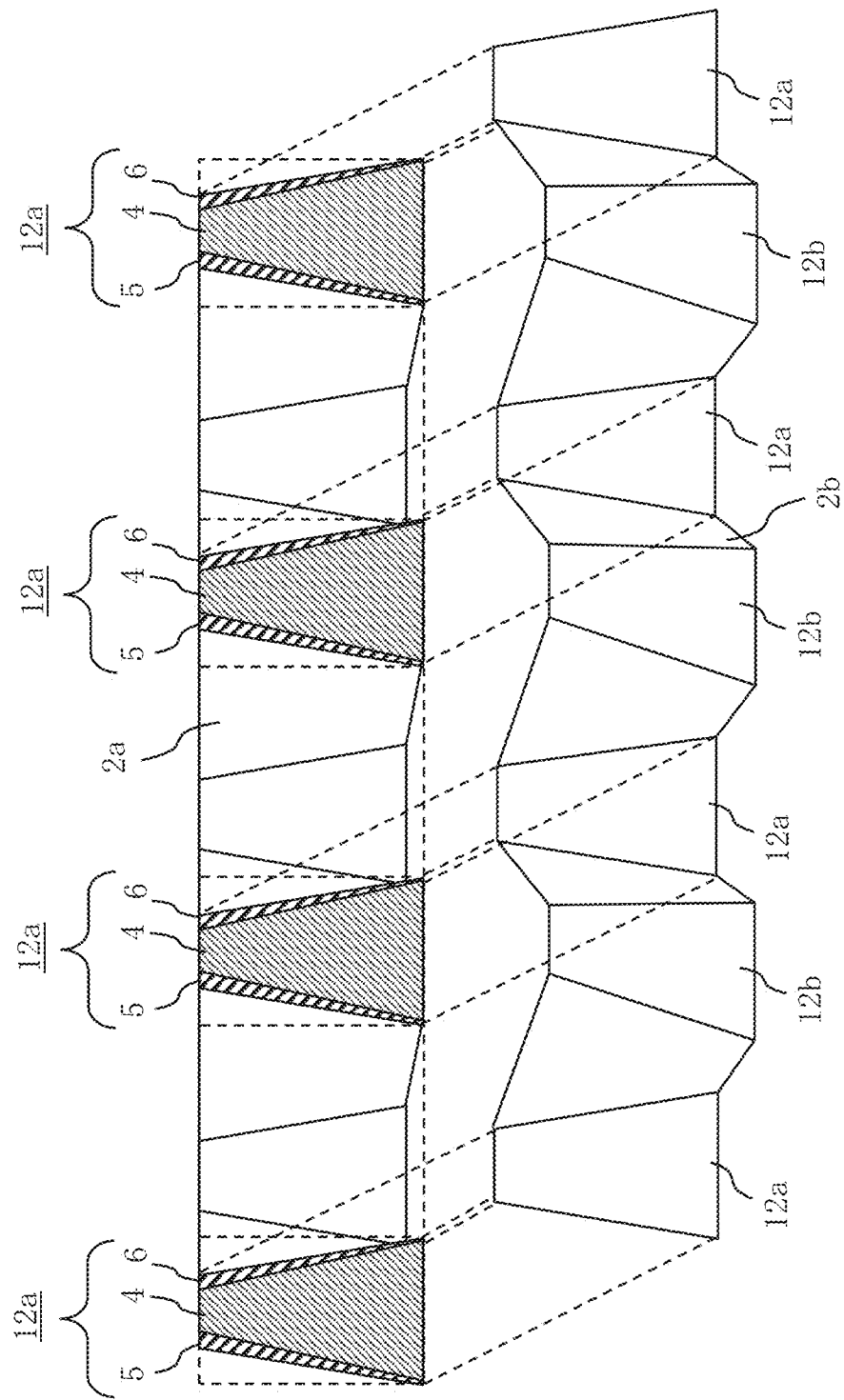
FIG. 7 is a schematic diagram explaining the honeycomb core precursor 13 according to the third embodiment.

FIG. 6 and FIG. 7 are schematic diagrams illustrating concrete examples of a honeycomb core precursor 13 according to a third embodiment.

FIG. 6 illustrates the honeycomb core precursor 13 which is a ribbon laminated body 1 extended to a cylindrical curved surface shape having thickness. The shape of the honeycomb core precursor 13 is a cylindrical shape having an axis along a longitudinal direction of one ribbon 2 included in a multilayer ribbon as a central axis. The shape of the honeycomb core precursor 13 may be a shape corresponding to a part of the cylindrical shape. The honeycomb core precursor 13 is also called a cylindrical extended honeycomb core precursor.

The ribbon 2a and the ribbon 2b are bonded at the ribbon joint 12a.

FIG. 7 illustrates a state wherein the ribbon 2a and the ribbon 2b are virtually detached so as to show the shape of the ribbon joint 12a when the ribbon laminated body 1 is extended.

Before extending the ribbon laminated body 1, the ribbon joint 12a joins the ribbon 2a and the ribbon 2b via the adhesion portion 4, the adhesion portion 5 and the adhesion portion 6. Each of the adhesion portion 5 and the adhesion portion 6 is partially peeled off when the ribbon laminated body 1 is extended, and the shape of the ribbon joint 12a becomes a trapezoidal shape having two parallel sides on the ribbon long side. Similarly, the shape of the ribbon joint 12b that joins the ribbon 2b and the ribbon 2c also becomes a trapezoidal shape. The shapes of all the ribbon joints 12 similarly become trapezoidal shapes, and as a result, the honeycomb core precursor 13 is extended to a cylindrical curved surface shape. In a case wherein the shape of the cylindrical curved surface shape is considered to be cylindrical, the range which the radius of the cylindrical curved surface shape can take is determined in accordance with the shape of the adhesion portion 4.

Further, by curing adhesives constituting each of the adhesion portion 5 and the adhesion portion 6 by heating the honeycomb core precursor 13 at a temperature equal to or higher than a temperature at which both of the adhesion portion 5 and the adhesion portion 6 are cured, that is, a temperature at which the high-temperature curing adhesive is cured, a honeycomb core extended to a cylindrical curved surface shape having thickness is created.

Description of Effect of Third Embodiment

As described above, according to the present embodiment, the honeycomb core precursor 13 used for creating a honeycomb core extended to a cylindrical curved surface shape having thickness is created.

Further, according to the present embodiment, in the step of extending the ribbon laminated body 1 to the cylindrical shape, it is possible to shape the ribbon laminated body 1 into a desired cylindrical shape without making a cell wall surface of the honeycomb core fall down sideways and the honeycomb core be deformed into a saddle shape, by making an adhesive that has not cured be partially peeled off in accordance with the cylindrical radius. Further, a bending surface is not generated in the cell wall surface since the adhesive that has not peeled off is cured, and the ribbons 2 are bonded together; therefore, the cell wall surface is unlikely to fall down sideways, and as a result, the shear stiffness of the honeycomb core is retained.

Furthermore, according to the present embodiment, in the step of extending the ribbon laminated body 1 into the cylindrical shape, when an adhesive that has not been cured is partially peeled off in accordance with the cylindrical radius, a non-adhesion portion that strides across the boundary of the cell wall surface of the honeycomb core is unlikely to be generated. Therefore, the cell wall surface is unlikely to fall down sideways, and as a result, the shear stiffness of the honeycomb core is retained.

Fourth Embodiment

Hereinafter, description will be made mainly on parts different from those of the embodiments described above, with reference to diagrams.

Description of Configuration

Figure 8:
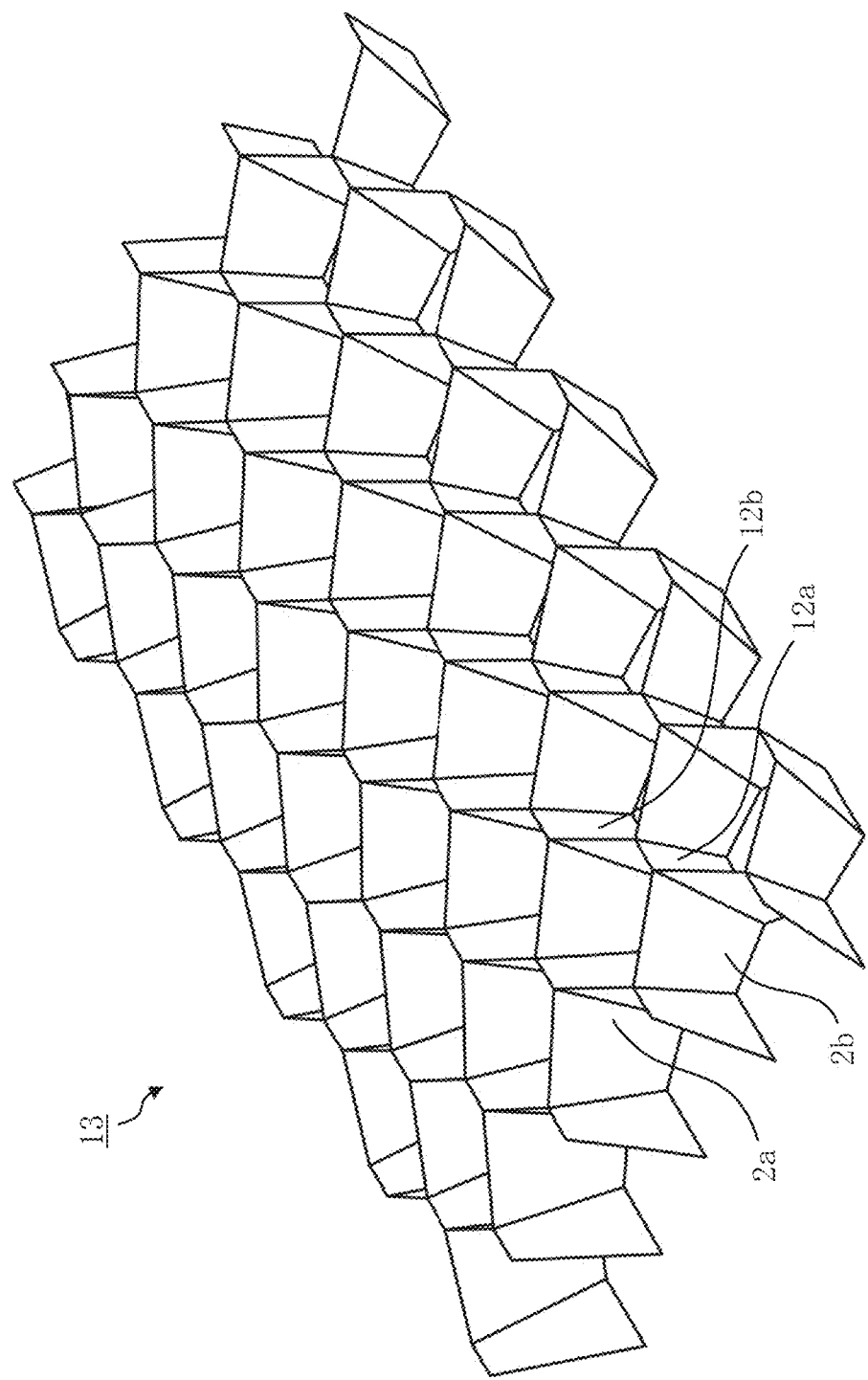
FIG. 8 is a schematic diagram illustrating the honeycomb core precursor 13 according to a fourth embodiment.
Figure 9:
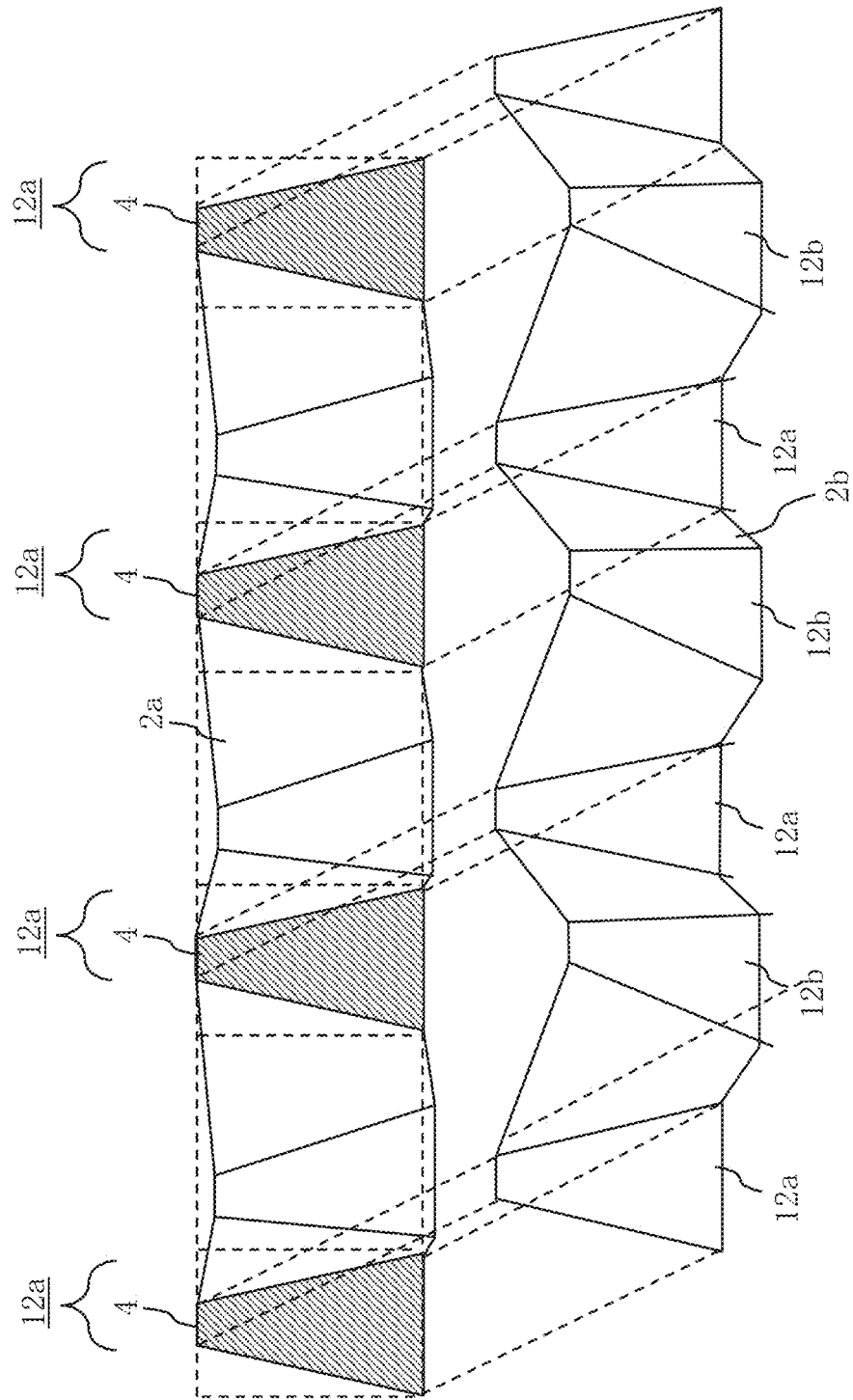
FIG. 9 is a schematic diagram explaining the honeycomb core precursor 13 according to the fourth embodiment.
Figure 10:
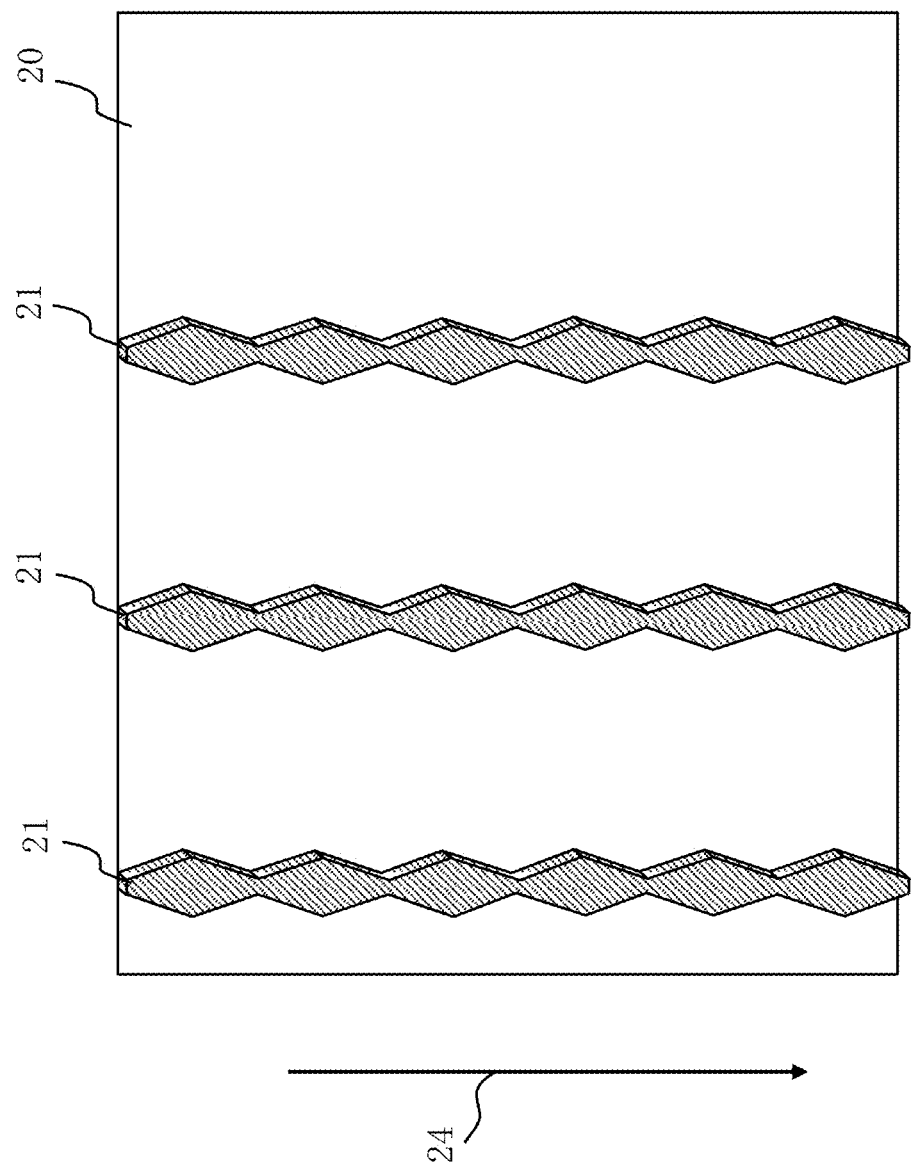
FIG. 10 is a schematic diagram explaining a creating method of the ribbon laminated body 1 according to a fifth embodiment.

FIG. 8 and FIG. 9 are schematic diagrams illustrating a concrete example of the honeycomb core precursor 13 according to a fourth embodiment.

FIG. 8 illustrates the honeycomb core precursor 13 in a case wherein the ribbon laminated body 1 is extended to a cylindrical curved surface shape.

The ribbon 2a and the ribbon 2b are bonded at the ribbon joint 12a.

FIG. 9 illustrates a state wherein the ribbon 2a and the ribbon 2b are virtually detached so as to show the shape of the ribbon joint 12a when the ribbon laminated body 1 is extended.

Before extending the ribbon laminated body 1, the ribbon joint 12a joins the ribbon 2a and the ribbon 2b via the adhesion portion 4, the adhesion portion 5 and the adhesion portion 6. Each of the adhesion portion 5 and the adhesion portion 6 is entirely peeled off when the ribbon laminated body 1 is extended, and the shape of the ribbon joint 12a becomes a trapezoidal shape with two parallel sides on the ribbon long side. Similarly, the shape of the ribbon joint 12b that joins the ribbon 2b and the ribbon 2c also becomes a trapezoidal shape. The shapes of all the ribbon joints 12 become trapezoidal shapes similarly, and as a result, the honeycomb core precursor 13 is extended to a cylindrical curved shape having thickness.

Further, by curing adhesives constituting each of the adhesion portion 5 and the adhesion portion 6 by heating the honeycomb core precursor 13 at a temperature at which both of the adhesion portion 5 and the adhesion portion 6 are cured, a honeycomb core extended to a cylindrical curved surface shape having thickness is created.

Description of Effect of Fourth Embodiment

As described above, according to the present embodiment, the honeycomb core precursor 13 used for creating a honeycomb core extended to a cylindrical curved surface shape having thickness is created.

Fifth Embodiment

Hereinafter, description will be made mainly on parts different from those of the embodiments described above with reference to diagrams.

Description of Configuration

A ribbon laminated body creating method to create a ribbon laminated body 1 includes an application step, a lamination step, an adhesion step, and a cutting step.

In the application step, a low-temperature curing adhesive is applied to make an application shape on an application surface being one side of a ribbon sheet 20. The application shape is a shape wherein a figure constituted by an area surrounded by a mountain shape projecting toward a direction along a direction orthogonal to an arrangement direction 24, an inverse-mountain shape corresponding to a shape symmetric to the mountain shape with respect to a central axis, a line connecting an end point in the arrangement direction 24 of the mountain shape and an end point in the arrangement direction 24 of the inverse-mountain shape, and a line connecting an end point in the direction opposite to the arrangement direction 24 of the mountain shape and an end point in the direction opposite to the arrangement direction 24 of the inverse-mountain shape is continuously arranged in a cycle along the arrangement direction 24. The center axis is an axis along the arrangement direction 24, and is an axis located in a direction opposite to the direction along the direction orthogonal to the arrangement direction 24 with respect to the mountain shape. Next, vertices of mountain shapes and vertices of inverse-mountain shapes are arranged along the direction orthogonal to the arrangement direction 24, with a designated pitch along the direction orthogonal to the arrangement direction 24, and the low-temperature curing adhesive is applied to make an application shape. Then, by applying high-temperature curing adhesives to both sides of each low-temperature curing adhesive applied, which are both sides in the direction along the direction orthogonal to the arrangement direction 24, adhesion belts constituted by the low-temperature curing adhesives and the high-temperature curing adhesives, and arranged with a designated pitch are formed. The application step is performed on ribbon sheets 20 for the number of application being the number of sheets corresponding to the scale of the honeycomb core to be created.

In the lamination step, the ribbon sheets 20 for the number of application whereon the adhesion belts are formed are first laminated so that any of each of two application surfaces does not face each other, the arrangement directions 24 are uniform, each of the positions of the vertices of the mountain shapes and each of the positions of the vertices of the inverse-mountain shapes are aligned in a direction along the direction orthogonal to the arrangement direction 24, and the positions of the adhesion belts in each two adjacent ribbon sheets 20 are shifted for a half pitch corresponding to half the interval of the designated pitch in the direction along the direction orthogonal to the arrangement direction 24. Next, after the ribbon sheets for the number of application are laminated, a ribbon sheet laminated body 26 is formed by superposing a ribbon sheet 20 whereon the adhesion belt has not been formed so as to cover the ribbon sheet 20 placed at the top layer.

In the adhesion step, a ribbon lamination adhesion block body 27 is created by curing the low-temperature curing adhesives included in the ribbon sheet laminated body 26 at a temperature equal to or higher than the temperature at which the low-temperature curing adhesive is cured, and lower than the temperature at which the high-temperature curing adhesive is cured.

In the cutting step, the ribbon lamination adhesion block body 27 is cut at a first cutting surface being a cross section along both of a direction along the direction orthogonal to the arrangement direction 24, and the lamination direction of the ribbon lamination adhesion block body 27, which is a cross section passing the vertices of the mountain shapes and the vertices of the inverse-mountain shapes. Further, the ribbon lamination adhesion block body 27 is cut at a second cutting surface being a cross section along both of a direction along the direction orthogonal to the arrangement direction 24, and the lamination direction of the ribbon lamination adhesion block diagram 27, which is a cross section passing vertices of valleys formed between adjacent mountain shapes, and vertices of valleys formed between adjacent inverse-mountain shapes. The vertices of the valleys formed between the adjacent mountain shapes are located on the boundary of the adjacent mountain shapes. The first cutting surface and the second cutting surface alternately appear along the arrangement direction 24.

Concrete description will be made on a ribbon laminated body creating method with reference to diagrams.

FIG. 10, FIG. 11, FIG. 12, and FIG. 13 are schematic diagrams illustrating concrete examples of a ribbon laminated body creating method according to the fifth embodiment.

First, adhesives 21 constituting the adhesion portion 4 are disposed on one side of the ribbon sheet 20. The ribbon sheet 20 is used for creating a honeycomb core, which is composed of aluminum or aramid fiber paper, etc., for example. The shape of the adhesives 21 is an application shape. A method to dispose the adhesives 21 is application, transference, or printing, for example. The shape of the adhesives 21 is a shape wherein shapes constituted by an area surrounded by a lateral V shape, which is a V shape rotated to a direction along the direction orthogonal to the arrangement direction 24, and a lateral inverse-V shape being a shape symmetric about a center axis being an axis parallel to the arrangement direction 24, and is an axis existing on the open side of the lateral V shape are continuously arranged in a cycle along the arrangement direction 24. The lateral V shape is a concrete example of the mountain shape. The lateral inverse-V shape is a concrete example of the inverse-mountain shape. The adhesives 21 are disposed with an equal pitch along the direction orthogonal to the arrangement direction. The arrangement direction 24 corresponds to a direction orthogonal to a ribbon longitudinal direction. The direction along the direction orthogonal to the arrangement direction 24 may not exactly be the same direction as the direction orthogonal to the arrangement direction 24. In addition, a direction along a certain direction may not exactly be the same direction as the certain direction.

Figure 11:
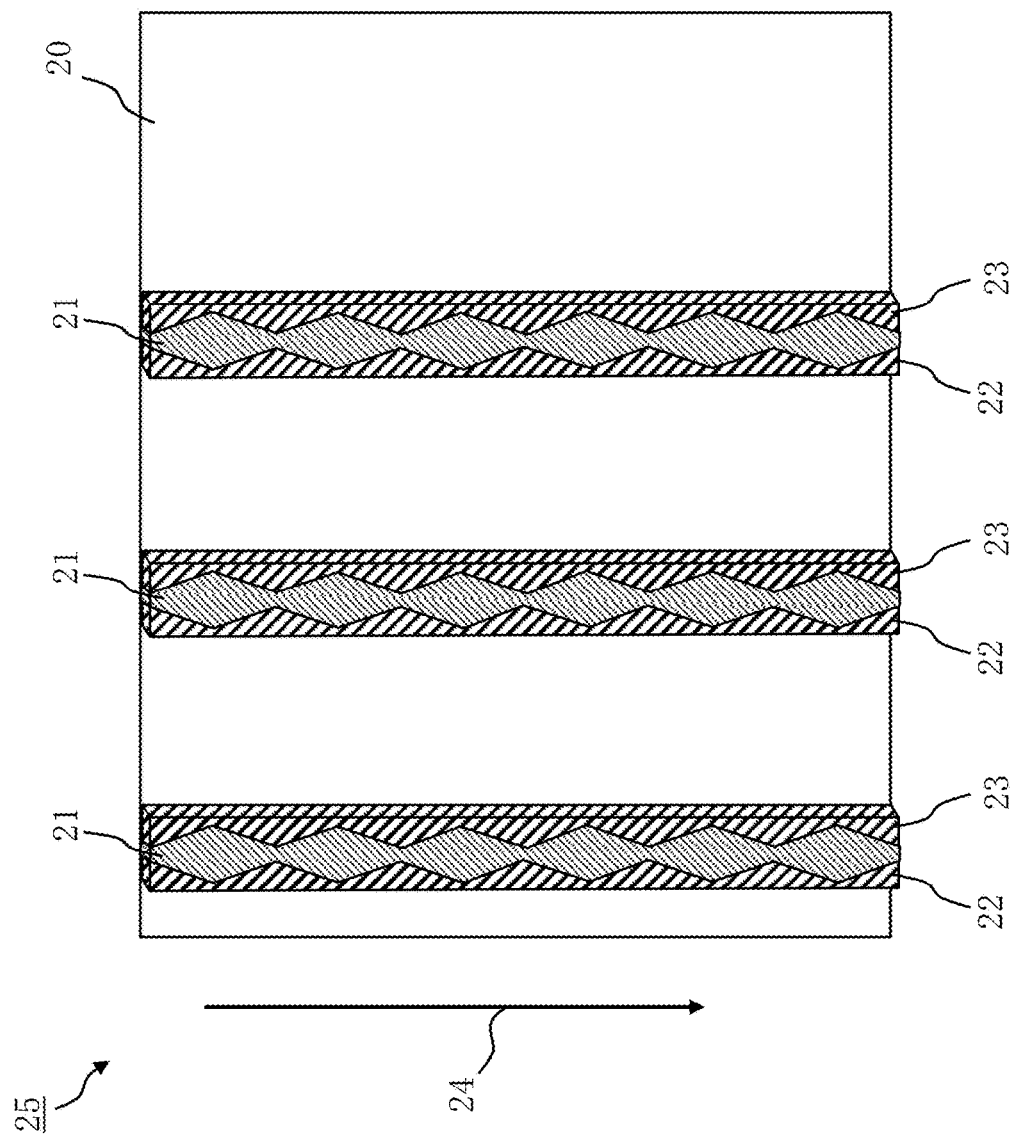
FIG. 11 is a schematic diagram explaining a creating method of the ribbon laminated body 1 according to the fifth embodiment.

Next, adhesives 22 constituting the adhesion portion 5 and adhesives 23 constituting the adhesion portion 6 are disposed on the surface of the ribbon sheet 20. A method to dispose each of the adhesives 22 and the adhesives 23 is application, transference, or printing, for example. While each shape of the adhesives 22 and the adhesives 23 may be any shape as long as it has a boundary to share with an adhesive 21, FIG. 11 illustrates a concrete example of the shape constituted by an adhesive 21, an adhesive 22 and an adhesive 23 having a rectangular shape. The rectangular shape corresponds to the adhesion belt. The adhesives 22 and the adhesives 23 are disposed with the same pitch as the adhesives 21 in the direction orthogonal to the arrangement direction. A ribbon sheet 25 is created in the procedure as described above. The ribbon sheet 25 is also called an adhesive application ribbon sheet.

Then, a ribbon sheet 25b is superposed on a ribbon sheet 25a in a ribbon sheet thickness direction. In this case, the ribbon sheet 25b is superposed on the ribbon sheet 25a by being shifted for a half pitch corresponding to half the interval of the pitch of the adhesives 21 in the direction along the direction orthogonal to the arrangement direction 24. That is, in a state wherein the ribbon sheet 25a and the ribbon sheet 25b are layered, the positions where the adhesives 21, the adhesives 22 and the adhesives 23 are disposed on the ribbon sheet 25a are shifted from the positions where the adhesives 21, the adhesives 22 and the adhesives 23 are disposed on the ribbon sheet 25b for half the pitch in the direction along the direction orthogonal to the arrangement direction 24. Similarly, a ribbon sheet laminated body 26 is formed by placing a ribbon sheet 20 as a top layer after layering a desired number of ribbon sheets 25 by repeatedly layering ribbon sheets 25 while shifting ribbon sheets 25 for half the pitch in the direction along the direction orthogonal to the arrangement direction 24 from the adjacent ribbon sheets 25. The ribbon sheet laminated body 26 is also called an adhesive application ribbon sheet lamination.

Figure 12:
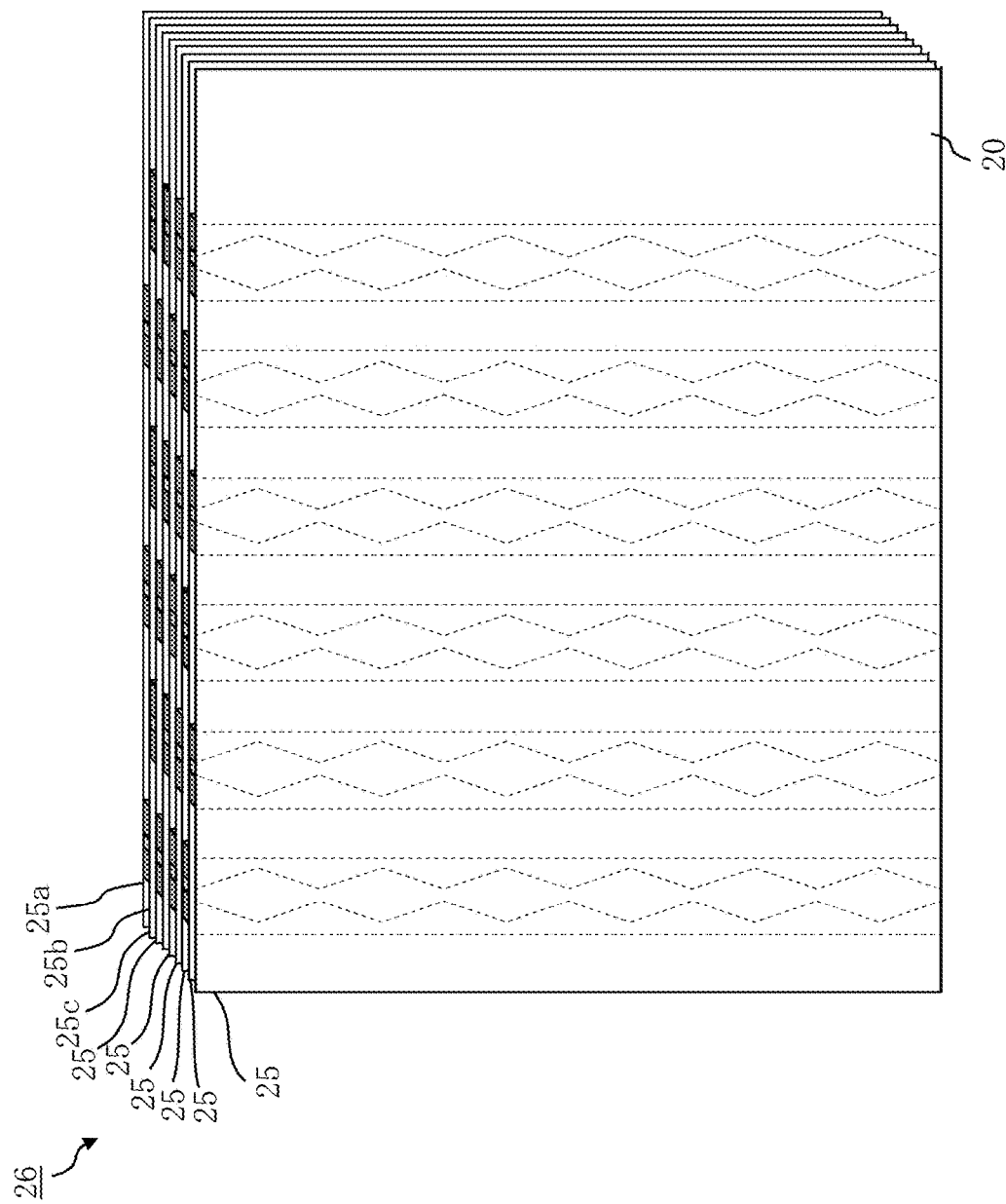
FIG. 12 is a schematic diagram explaining a creating method of the ribbon laminated body 1 according to the fifth embodiment.

Next, by curing only the adhesives 21 of the ribbon sheet laminated body 26 without curing the adhesives 22 and the adhesives 23 of the ribbon sheet laminated body 26, the ribbon lamination adhesion block body 27 is created. As a concrete example, when the adhesive 21 is a room-temperature curing type adhesive, the ribbon sheet laminated body 26 is left for a prescribed time at normal temperature. In the present example, only the adhesives 21 are cured, and the adhesives 22 and the adhesives 23 are not cured. Further, by heating the ribbon sheet laminated body 26 for a prescribed time at a temperature at which the adhesives 21 are cured, but the adhesives 22 and the adhesives 23 are not cured, it is possible to make only the adhesives 21 be cured. FIG. 12 illustrates a concrete example of the ribbon sheet laminated body 26.

Figure 13:
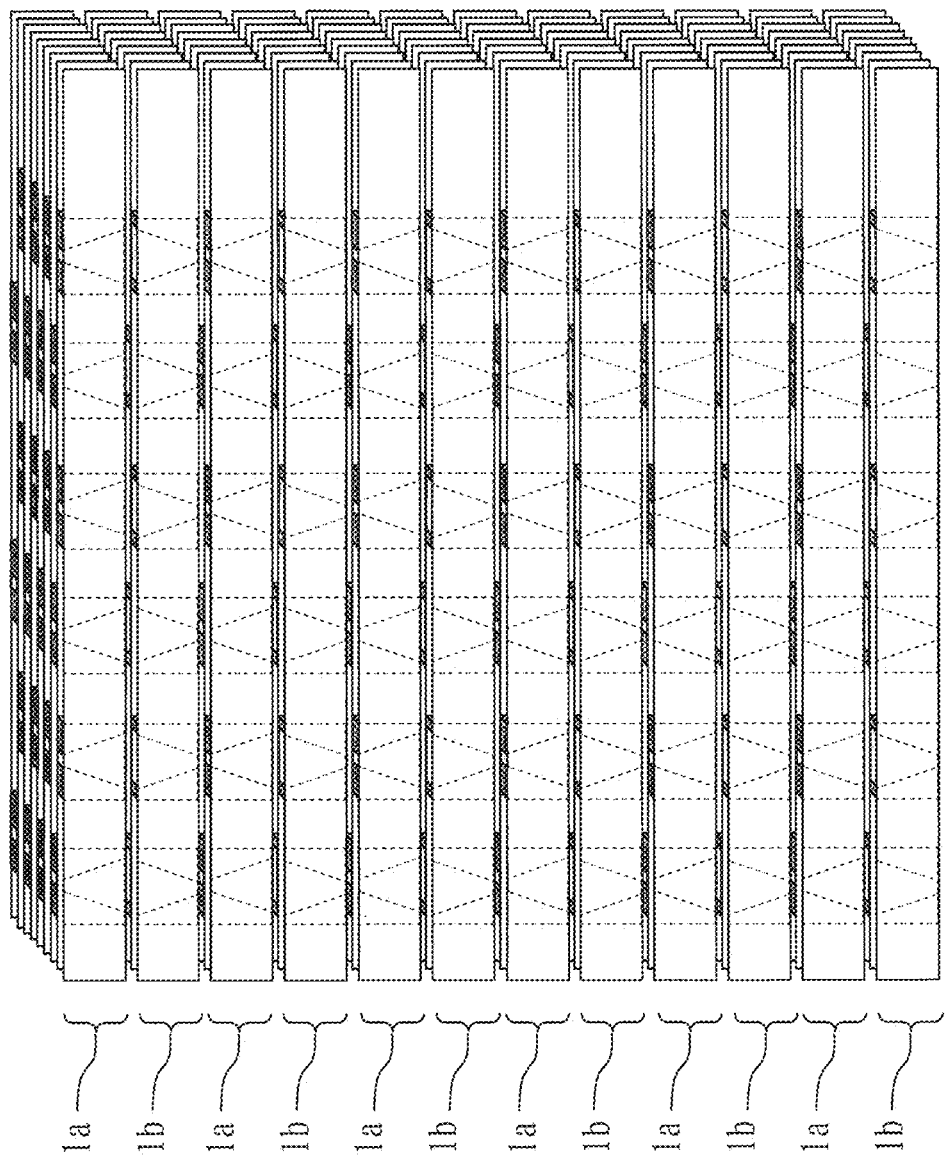
FIG. 13 is a schematic diagram explaining a creating method of the ribbon laminated body 1 according to the fifth embodiment.

Then, a ribbon laminated body 1a and a ribbon laminated body 1b are created by cutting the ribbon lamination adhesion block body 27 at each of a plane that is orthogonal to the arrangement direction 24, which passes the vertices of the mountain shapes at the boundaries between each of the adhesive 21, the adhesive 22 and the adhesive 23, and a plane that is orthogonal to the arrangement direction 24, which passes the vertices of the valleys at the boundaries. FIG. 13 illustrates a concrete example of the ribbon laminated body 1a and the ribbon laminated body 1b.

Description of Effect of Fifth Embodiment

As described above, according to the present embodiment, a ribbon laminated body 1 is created.

Sixth Embodiment

Hereinafter, description will be made mainly on points different from those of the embodiments described above with reference to diagrams.

Description of Configuration

Figure 14:
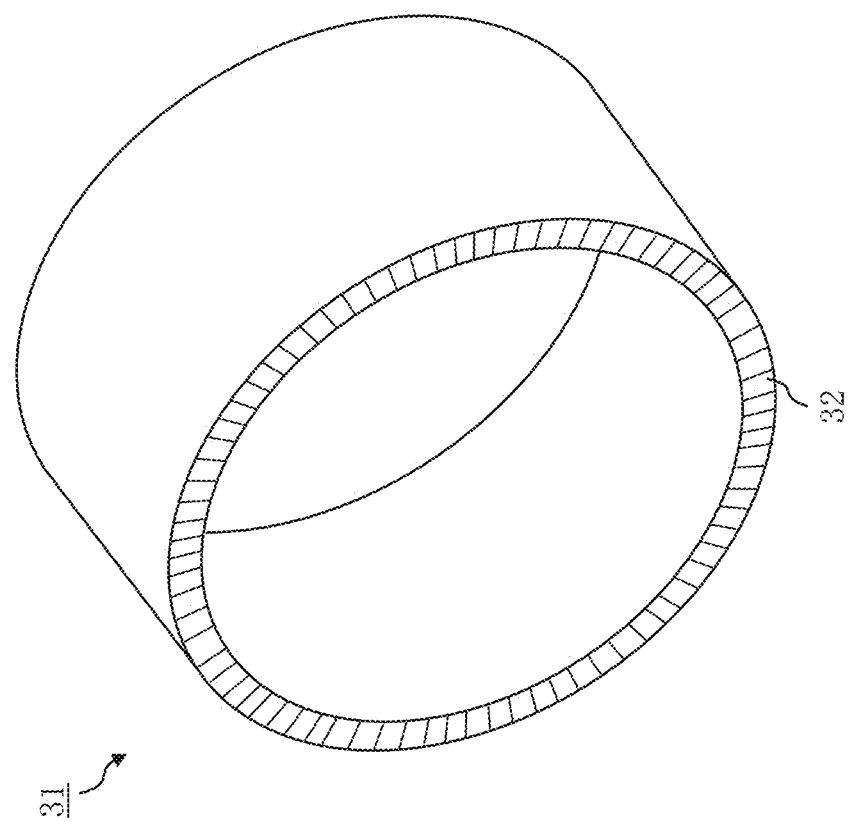
FIG. 14 is a schematic diagram illustrating a cylindrical structure 31 according to a sixth embodiment.
Figure 15:
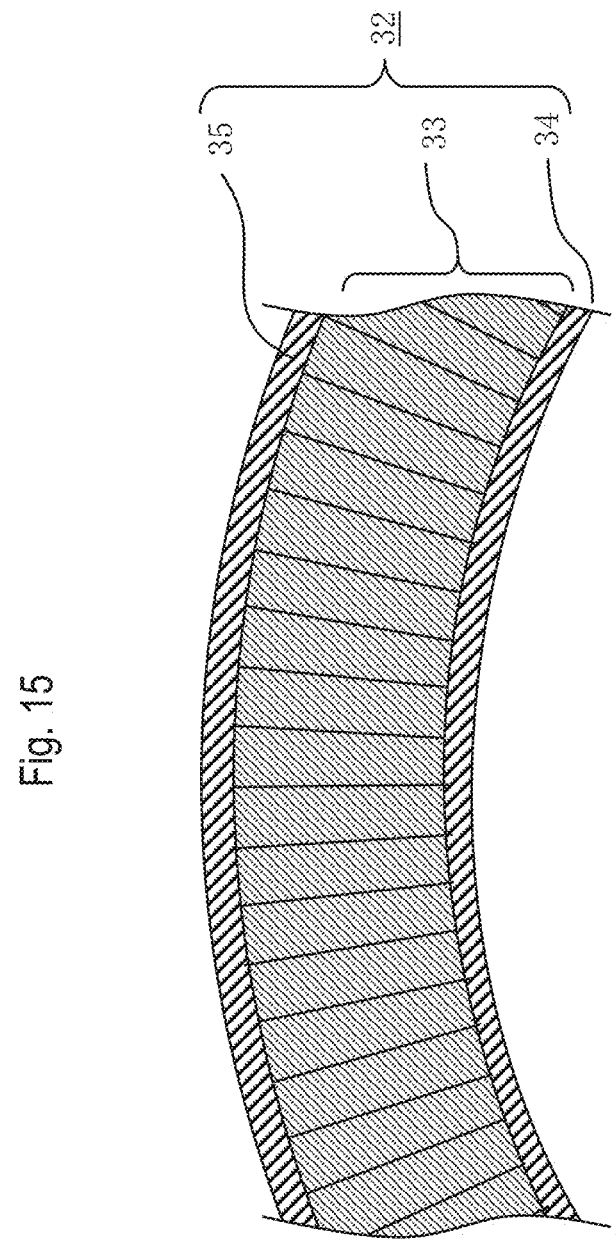
FIG. 15 is a schematic diagram explaining a state wherein the cylindrical structure 31 is enlarged according to the sixth embodiment.

FIG. 14 and FIG. 15 are schematic diagrams illustrating a concrete example of a cylindrical structure 31 using a honeycomb core 33 according to a sixth embodiment. The cylindrical structure 31 is also called a honeycomb sandwich cylindrical structure. FIG. 15 illustrates a state wherein a part of FIG. 14 is enlarged.

The honeycomb core 33 is extended to a cylindrical curved surface shape having thickness.

The cylindrical structure 31 is a central cylinder for an artificial satellite, for example. The cylindrical structure 31 is constituted by a honeycomb sandwich 32. The cylindrical structure 31 has a sandwich structure with the honeycomb core 33 as a core material, wherein the inner side of the honeycomb core 33 is covered with a cylindrical inner diameter-side outer layer 34, and the outer side of the honeycomb core 33 is covered with a cylindrical outer diameter-side outer layer 35.

In the honeycomb sandwich 32, the cylindrical inner diameter-side outer layer 34 is joined to the inner diameter-side surface of the honeycomb core 33, and the cylindrical outer diameter-side outer layer 35 is joined to the outer diameter-side surface of the honeycomb core 33.

Description of Effect of Sixth Embodiment

As described above, according to the present embodiment, since the shear stiffness of the honeycomb core 33 is retained, a cylindrical structure 31 light in weight and high in stiffness is realized.

Further, since the shear stiffness of the honeycomb core 33 is retained, a central cylinder for an artificial satellite configured by the cylindrical structure 31 is light in weight and high in stiffness.

Seventh Embodiment

Hereinafter, description will be made mainly on parts different from those in the embodiments described above, with reference to diagrams.

Description of Configuration

Figure 16:
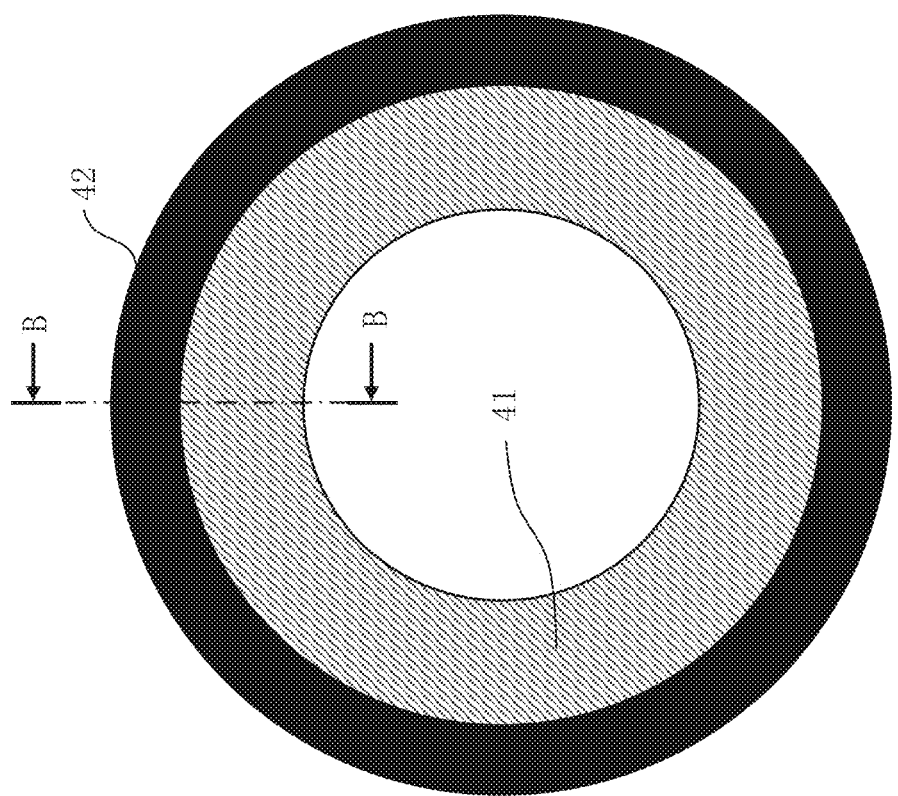
FIG. 16 is a schematic diagram explaining a creating method of the cylindrical structure 31 according to a seventh embodiment.
Figure 17:
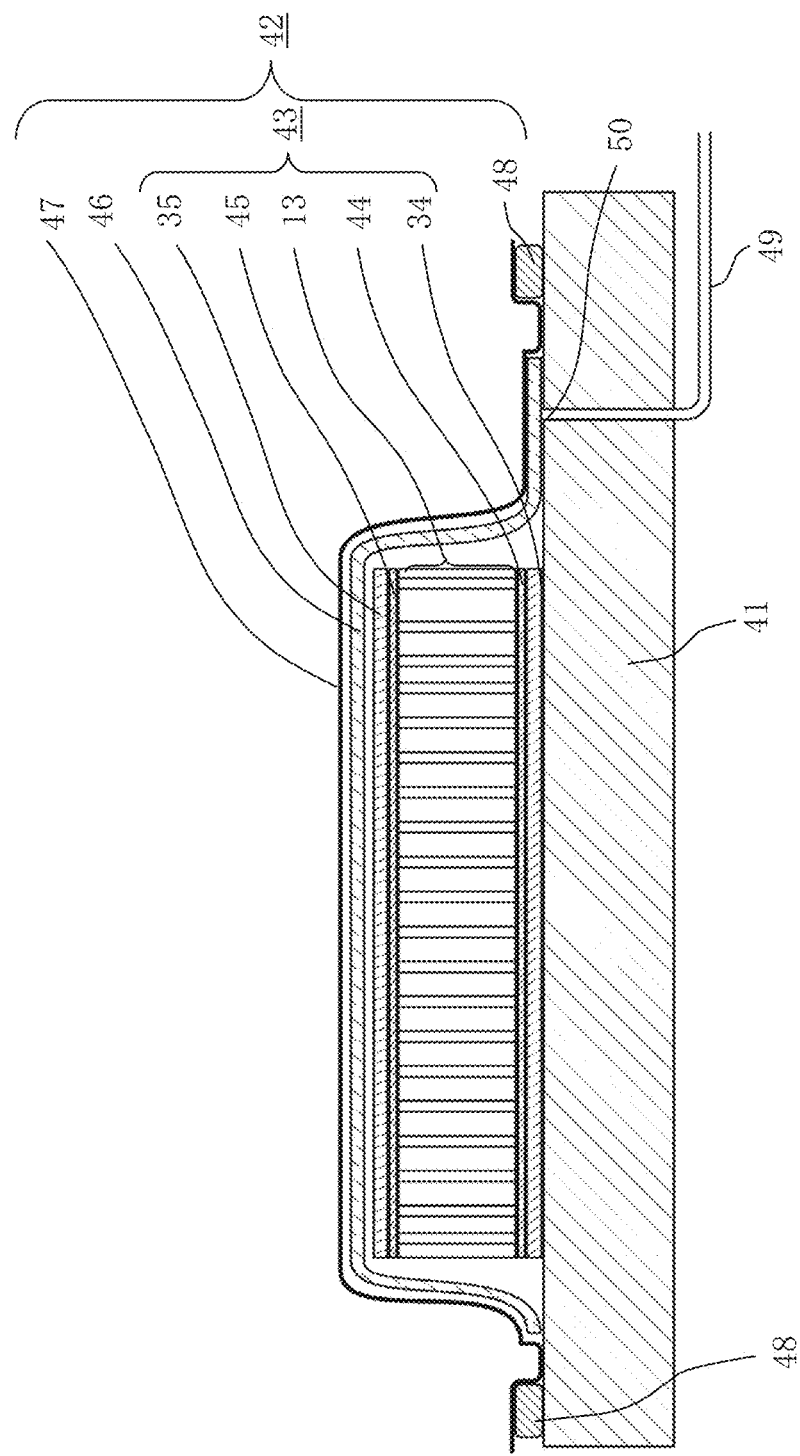
FIG. 17 is a schematic diagram explaining a creating method of the cylindrical structure 31 according to the seventh embodiment.
Figure 18:
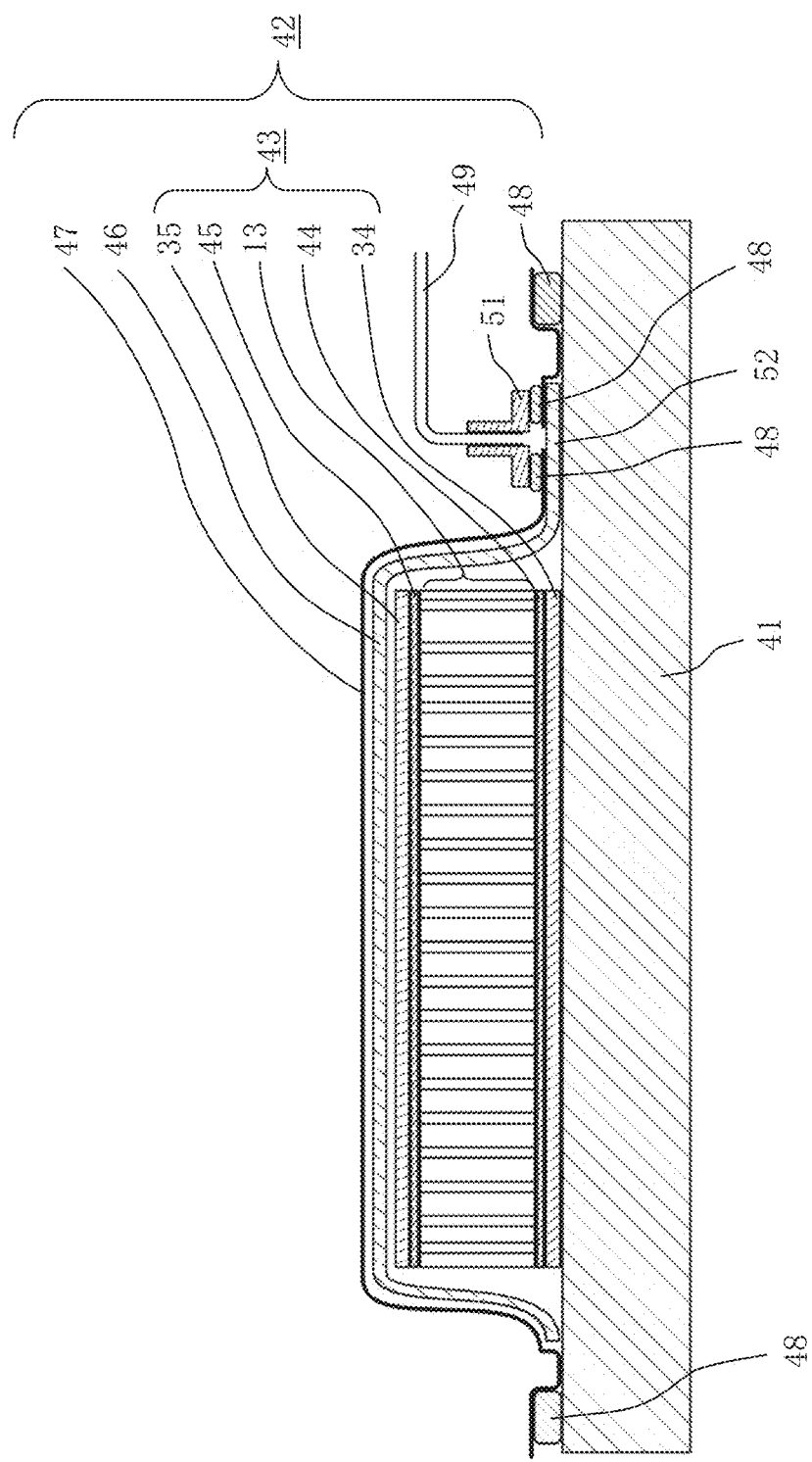
FIG. 18 is a schematic diagram explaining a creating method of the cylindrical structure 31 according to the seventh embodiment.

FIG. 16, FIG. 17, and FIG. 18 are schematic diagrams illustrating a concrete example of a creating method of the cylindrical structure 31 according to the seventh embodiment.

In FIG. 16, a molding material 42 is disposed over the outer diameter surface of a mandrel jig 41. FIG. 17 illustrates a concrete example of a B-B cross section illustrated in FIG. 16. The configuration and a disposing procedure of the molding material 42 will be described below.

First, a cylindrical inner diameter-side outer layer 34 is provided over the outer diameter-side surface of the mandrel jig 41. The cylindrical inner diameter-side outer layer 34 may be molded into a cylindrical shape beforehand using the mandrel jig 41; however, in a case wherein the stiffness of the cylindrical inner diameter-side outer layer 34 is sufficiently small, the cylindrical inner diameter-side outer layer 34 molded into a planar shape beforehand may be shaped over the outer diameter-side surface of the mandrel jig 41.

Next, an adhesive 44 is disposed over the surface of the cylindrical inner diameter-side outer layer 34. As a method to dispose the adhesive 44, for example, there exists a method to layer an adhesive 44 formed into a film shape that has not been cured on the surface of the cylindrical inner diameter-side outer layer 34, or a method to apply an adhesive 44 in a viscous liquid form or a paste form to a surface of the cylindrical inner diameter-side outer layer. The curing temperature of the adhesive 44 is equal to or higher than either higher temperature of the curing temperatures of each of the adhesion portion 5 and the adhesion portion 6 that constitute the honeycomb core precursor 13.

Then, the honeycomb core precursor 13 is shaped on the surface of the adhesive 44.

Next, an adhesive 45 is disposed on the surface of the honeycomb core precursor 13. As a method to dispose the adhesive 45, for example, there exists a method to layer an adhesive 45 formed into a film shape that has not been cured on the surface of the honeycomb core precursor 13, or a method to apply an adhesive 45 in a viscous liquid form or a paste form to the surface of the honeycomb core precursor 13. The curing temperature of the adhesive 45 is equal to or higher than either higher temperature of the curing temperatures of each of the adhesion portion 5 and the adhesion portion 6 that constitute the honeycomb core precursor 13.

Then, a cylindrical outer diameter-side outer layer 35 is disposed on the surface of the adhesive 45. As a method to dispose the cylindrical outer diameter-side outer layer 35, for example, there exists a method to shape a cylindrical outer diameter-side outer layer 35 molded in a C-shape beforehand on the surface of the adhesive 45, or a method to shape the cylindrical outer diameter-side outer layer 35 molded in a planar shape beforehand on the surface of the adhesive 45 in a case wherein the stiffness of the cylindrical outer diameter-side outer layer 35 is small enough.

Next, a breather 46 is placed so as to cover the surface of a sandwich precursor 43 formed on the outer diameter-side surface of the mandrel jig 41 in the method as described above, and a suction opening 50 formed in the outer diameter surface of the mandrel jig 41. The breather 46 is a material for ventilation inside a bag being molded, and glass fiber fabric or polyester mat, etc. is used as a raw material of the breather 46. By performing sealing using the sandwich precursor 43, the breather 46, a bagging film 47 and a sealant 48, and performing vacuum exhaustion from a vacuum tube 49 connected via the suction opening 50, pressure is applied in the thickness direction of the sandwich precursor 43, the cylindrical inner diameter-side outer layer 34 and the honeycomb core precursor 13 are adhered to each other via the adhesive 44, and the cylindrical outer diameter-side outer layer 35 and the honeycomb core precursor 13 are adhered to each other via the adhesive 45. When it is difficult to form the suction opening 50 in the mandrel jig 41, a vacuum jig 51 and the vacuum tube 49 may be connected in a method capable of retaining airtightness of the space sealed with the bagging film 47, the sealant 48 and the mandrel jig 41, by opening a vacuum suction hole 52 in the bagging film 47 as illustrated in FIG. 18, surrounding the periphery of the vacuum suction hole 52 with the sealant 48, and making the vacuum jig 51 adhere to the sealant 48.

Then, the molding material 42 and the mandrel jig 41 are heated in a state of being applied the pressure by vacuum exhaustion as described above.

In the step above, by curing the adhesive 44, the adhesive 45, and the adhesion portion 5 and the adhesion portion 6 constituting the honeycomb core precursor 13, a cylindrical structure 31 is created.

Description of Effect of Seventh Embodiment

As described above, according to the present embodiment, the cylindrical structure 31 is created.

Further, according to the present embodiment, curing of adhesives to join an outer layer of a sandwich structure and the honeycomb core precursor 13, and curing of high-temperature curing adhesives that constitute the honeycomb core precursor 13 are performed in one step.

Eighth Embodiment

Hereinafter, description will be made mainly on points different from those of the embodiments described above with reference to diagrams.

Description of Configuration

Figure 19:
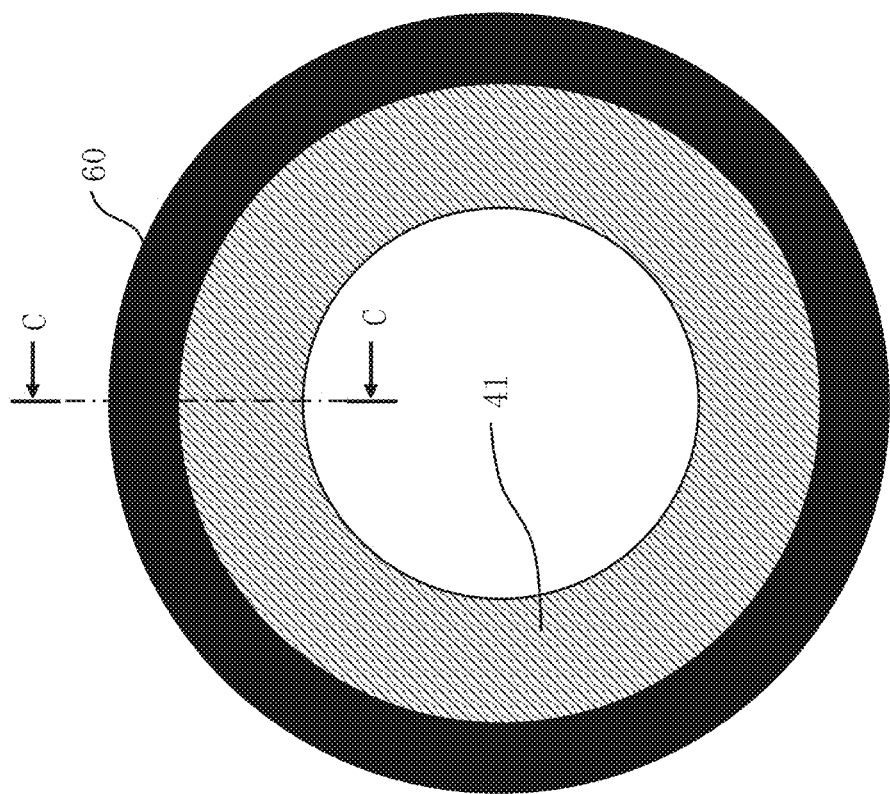
FIG. 19 is a schematic diagram explaining a creating method of the cylindrical structure 31 according to an eighth embodiment.
Figure 20:
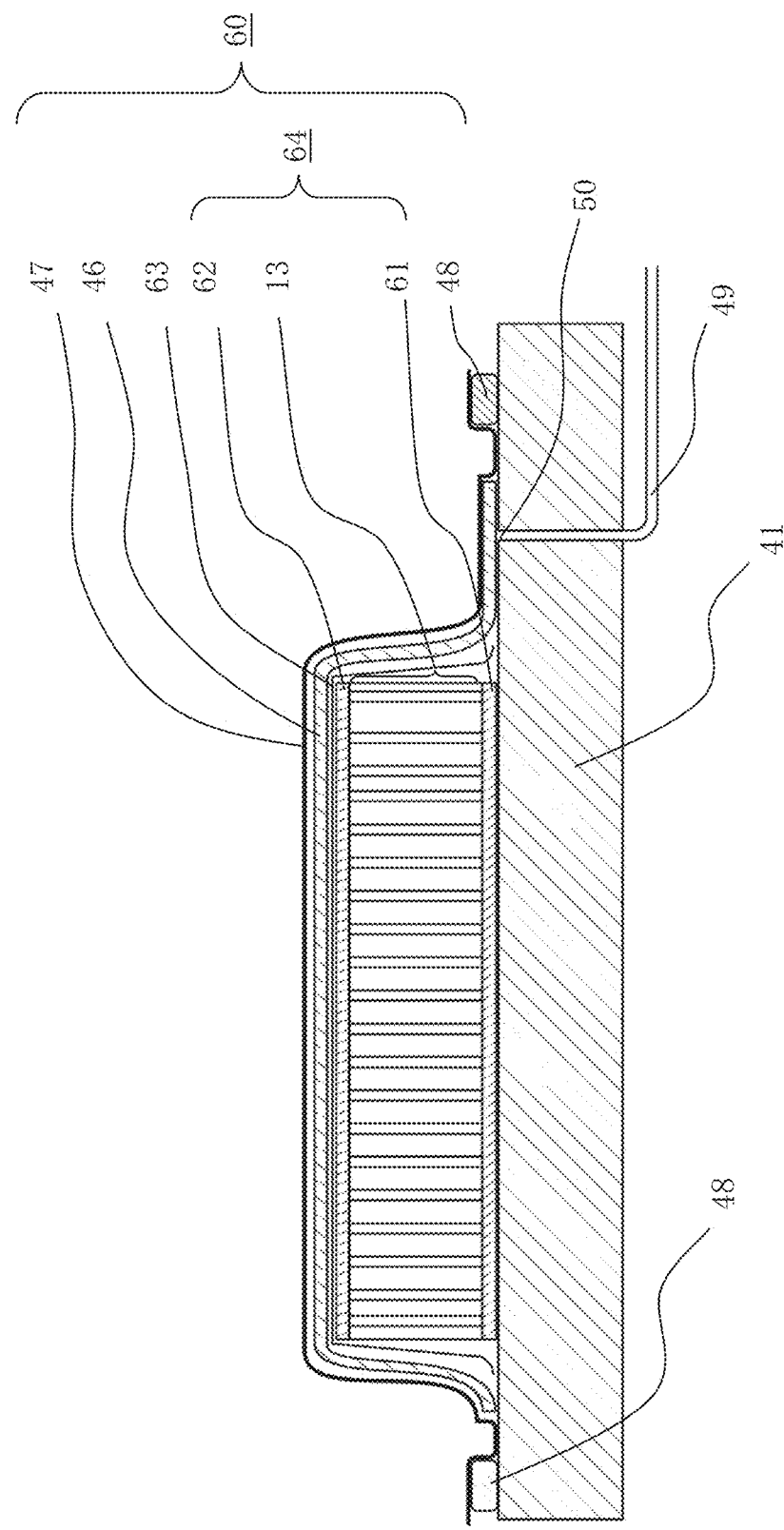
FIG. 20 is a schematic diagram explaining a creating method of the cylindrical structure 31 according to the eighth embodiment.
Figure 21:
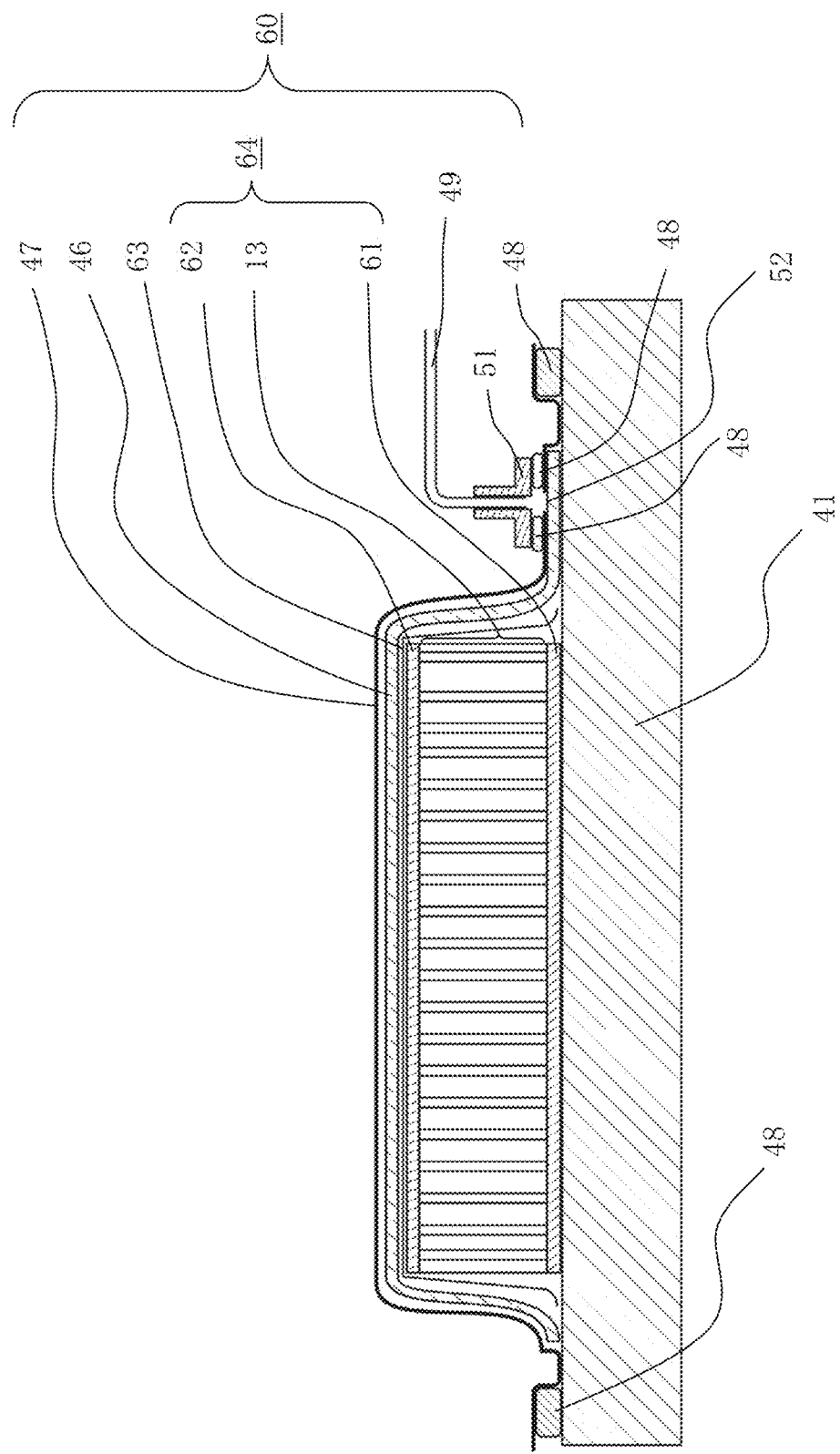
FIG. 21 is a schematic diagram explaining a creating method of the cylindrical structure 31 according to the eighth embodiment.

FIG. 19, FIG. 20, and FIG. 21 are schematic diagrams illustrating a concrete example of a creating method of a cylindrical structure 31 according to an eighth embodiment.

In FIG. 19, a molding material 60 is disposed on the outer diameter surface of the mandrel jig 41. FIG. 20 illustrates a concrete example of a C-C cross section illustrated in FIG. 19. The configuration and the disposal procedure of the molding material 60 will be described below.

First, an intermediate base material for an inner diameter-side outer layer 61 is layered on the outer diameter-side surface of the mandrel jig 41. For the intermediate base material for the inner diameter-side outer layer 61, for example, a prepreg wherein resin has permeated fiber in advance and semi-cured is used. The curing temperature of the resin of the intermediate base material for the inner diameter-side outer layer 61 is equal to or higher than either higher temperature of curing temperatures of each of an adhesion portion 5 and an adhesion portion 6 that constitute a honeycomb core precursor 13.

Next, the honeycomb core precursor 13 is shaped on the surface of the honeycomb core precursor 13.

Then, an intermediate base material for an outer diameter-side outer layer 62 is layered on the surface of the honeycomb core precursor 13. For the intermediate base material for the outer diameter-side outer layer 62, for example, a prepreg wherein resin has permeated fiber in advance and semi-cured is used. The curing temperature of the resin of the intermediate base material for the outer diameter-side outer layer 62 is equal to or higher than either higher temperature of the curing temperatures of each of the adhesion portion 5 and the adhesion portion 6 that constitute the honeycomb core precursor 13. According to the method as described above, a mold release film 63 is placed so as to cover an exposed surface of the sandwich precursor 64 formed on the outer diameter-side surface of the mandrel jig 41.

Next, a breather 46 is placed so as to cover the outer exposed surface of the mold release film 63 and a suction opening 50 formed in the outer diameter surface of the mandrel jig 41. The breather 46 is the same as the breather 46 according to the seventh embodiment. By performing sealing of the whole of the sandwich precursor 64 and the breather 46 using a bagging film 47 and a sealant 48, and performing vacuum exhaustion from a vacuum tube 49 connected via the suction opening 50, pressure is applied in the thickness direction of the sandwich precursor 64, the intermediate base material for the inner diameter-side outer layer 61 and the honeycomb core precursor 13 are adhered to each other, and the intermediate base material for the outer diameter-side outer layer 62 and the honeycomb core precursor 13 are adhered to each other. FIG. 21 illustrates a countermeasure for a case wherein it is difficult to form a suction opening 50 in the mandrel jig 41. FIG. 21 is equivalent to FIG. 18.

Next, a molding material 60 and the mandrel jig 41 are heated while being applied the pressure by vacuum exhaustion as described above.

In the step above, by curing the intermediate base material for the inner diameter-side outer layer 61, the intermediate base material for the outer diameter-side outer layer 62, and the adhesion portion 5 and the adhesion portion 6 constituting the honeycomb core precursor 13, a cylindrical structure 31 is created.

Description of Effect of Eighth Embodiment

As described above, according to the present embodiment, a cylindrical structure 31 is created.

Further, according to the present embodiment, curing of the intermediate base material for the inner diameter-side outer layer 61 and the intermediate base material for the outer diameter-side outer layer 62 in a sandwich structure, and curing of high-temperature curing adhesives constituting the honeycomb core precursor 13 are performed in one step.

Other Embodiments

It is possible to arbitrarily combine each embodiment described above, to deform an arbitrary component of each embodiment, or to omit an arbitrary component in each embodiment.

Further, the embodiment of the present disclosure is not limited to what described in First to Eighth Embodiments, for which various alterations are possible as needed. The creating procedure described may be appropriately changed.

REFERENCE SIGNS LIST

1, 1*a*, 1*b*: ribbon laminated body; 2, 2*a*, 2*b*, 2*c*: ribbon; 3, 3*a*, 3*b*, 4, 5, 6: adhesion portion; 7, 8: ribbon long side; 11: honeycomb core precursor; 12, 12*a*, 12*b*: ribbon joint; 13: honeycomb core precursor; 20: ribbon sheet; 21, 22, 23: adhesive; 24: arrangement direction; 25, 25*a*, 25*b*: ribbon sheet; 26: ribbon sheet laminated body; 27: ribbon lamination adhesion block body; 31: cylindrical structure; 32: honeycomb sandwich; 33: honeycomb core; 34: cylindrical inner diameter-side outer layer; 35: cylindrical outer diameter-side outer layer; 41: mandrel jig; 42: molding material; 43: sandwich precursor; 44, 45: adhesive; 46: breather; 47: bagging film; 48: sealant; 49: vacuum tube; 50: suction opening; 51: vacuum jig; 52: vacuum suction hole; 60: molding material; 61: intermediate base material for inner diameter-side outer layer; 62: intermediate base material for outer diameter-side outer layer; 63: mold release film; 64: sandwich precursor.

The invention claimed is:

1. A ribbon laminated body used for creating a honeycomb core, the ribbon laminated body comprising:
   a multilayer ribbon wherein a plurality of layers of ribbons are laminated; a low-temperature curing adhesion portion constituted by a low-temperature curing adhesive; and
   a high-temperature curing adhesion portion constituted by a high-temperature adhesive that is cured at a temperature higher than a temperature at which the low-temperature curing adhesive is cured, wherein
   in the multilayer ribbon, the plurality of layers of ribbons are laminated so that two long sides included in each ribbon of the plurality of ribbons are aligned with one another,
   in the multilayer ribbon, between each two ribbons of the plurality of ribbons adjacent to each other, the low-temperature curing adhesion portion adhesively bonds each of the two ribbons, which is in contact with each of the two ribbons, and the high-temperature curing adhesion portion which is in contact with each of the two ribbons exist,
   in a part where the low-temperature curing adhesion portion is in contact with each of the two ribbons, a shape of the low-temperature curing adhesion portion is a trapezoidal shape having an upper base, a lower base longer than the upper base, and two oblique sides, wherein an angle formed by the upper base and each of the two oblique sides is an obtuse angle, and wherein at least a part of the upper base is overlapped with a part of one of the two long sides of each of the two ribbons, and at least a part of the lower base is overlapped with a part of the other of the two long sides of each of the two ribbons,
   the low-temperature curing adhesion portion is cured, and the high-temperature curing adhesion portion is not cured,
   in a portion where the high-temperature curing adhesion portion is in contact with each of the two ribbons, the high-temperature curing adhesion portion is in contact with the two oblique sides included in the low-temperature curing adhesion portion, and
   at least a part of the portion where the high-temperature curing adhesion portion is in contact with each of the two ribbons is peeled off by an extension force at a time when a honeycomb core precursor corresponding to the ribbon laminated body is generated.

2. The ribbon laminated body as defined in claim 1, wherein in the portion where the high-temperature curing adhesion portion is in contact with each of the two ribbons, a part of a periphery of the high-temperature curing adhesion portion is overlapped with the part of one of the two long sides of each of the two ribbons.

3. The ribbon laminated body as defined in claim 1, wherein the low-temperature curing adhesive cures at room temperature.

4. The ribbon laminated body as defined in claim 1, wherein the high-temperature curing adhesion portion surrounds the two oblique sides of the low-temperature curing adhesion portion.

\* \* \* \* \*